(12) United States Patent
Hsiang et al.

(10) Patent No.: US 11,924,426 B2
(45) Date of Patent: *Mar. 5, 2024

(54) SIGNALING BLOCK PARTITIONING OF IMAGE AND VIDEO

(71) Applicant: HFI INNOVATION INC., Zhubei (TW)

(72) Inventors: Shih-Ta Hsiang, Hsinchu (TW); Chen-Yen Lai, Hsinchu (TW); Ching-Yeh Chen, Hsinchu (TW)

(73) Assignee: HFI INNOVATION INC., Zhubei (TW)

( * ) Notice: Subject to any disclaimer, the term of this patent is extended or adjusted under 35 U.S.C. 154(b) by 0 days.

This patent is subject to a terminal disclaimer.

(21) Appl. No.: 18/158,144

(22) Filed: Jan. 23, 2023

(65) Prior Publication Data

US 2023/0164318 A1 May 25, 2023

Related U.S. Application Data

(63) Continuation of application No. 17/068,817, filed on Oct. 12, 2020, now Pat. No. 11,589,044.

(Continued)

(51) Int. Cl.
*H04N 11/02* (2006.01)
*H04N 19/119* (2014.01)
(Continued)

(52) U.S. Cl.
CPC ......... *H04N 19/119* (2014.11); *H04N 19/176* (2014.11); *H04N 19/184* (2014.11); *H04N 19/44* (2014.11); *H04N 19/96* (2014.11)

(58) Field of Classification Search
CPC .................................................... H04N 19/119
(Continued)

(56) References Cited

U.S. PATENT DOCUMENTS

2017/0244964 A1 8/2017 Liu et al.
2018/0070110 A1* 3/2018 Chuang ............... H04N 19/134
(Continued)

FOREIGN PATENT DOCUMENTS

WO WO 2018065567 A1 4/2018
WO WO 2019174594 A1 9/2019

OTHER PUBLICATIONS

Indian Office Action dated Sep. 9, 2022 in Indian Patent Application No. 20222027205, 7 pages.
(Continued)

*Primary Examiner* — Leron Beck
(74) *Attorney, Agent, or Firm* — Oblon, McClelland, Maier & Neustadt, L.L.P.

(57) ABSTRACT

A video system that applies constraints on block partitioning is provided. The system receives a partitioning control parameter from a bitstream specifying a maximum block size for enabling ternary-tree split that is constrained to be 64 or smaller. The system receives data from a bitstream for a block of pixels to be decoded as a current block of a current picture of a video. The system splits the current block into one or more partitions recursively, wherein ternary split is disallowed for a partition of the current block unless the partition is less than or equal to the maximum block size. The system reconstructs the one or more partitions of the current block.

6 Claims, 12 Drawing Sheets

Related U.S. Application Data

(60) Provisional application No. 62/956,359, filed on Jan. 2, 2020, provisional application No. 62/930,084, filed on Nov. 4, 2019, provisional application No. 62/916,891, filed on Oct. 18, 2019, provisional application No. 62/915,049, filed on Oct. 15, 2019, provisional application No. 62/914,577, filed on Oct. 14, 2019.

(51) Int. Cl.
*H04N 19/176* (2014.01)
*H04N 19/184* (2014.01)
*H04N 19/44* (2014.01)
*H04N 19/96* (2014.01)

(58) Field of Classification Search
USPC ........................................ 375/240.01–240.29
See application file for complete search history.

(56) References Cited

U.S. PATENT DOCUMENTS

| | | | |
|---|---|---|---|
| 2018/0077417 A1 | 3/2018 | Huang | |
| 2018/0367818 A1* | 12/2018 | Liu | H04N 19/124 |
| 2019/0075328 A1 | 3/2019 | Huang et al. | |
| 2019/0281296 A1 | 9/2019 | Li et al. | |
| 2019/0306505 A1 | 10/2019 | Li et al. | |
| 2019/0306506 A1 | 10/2019 | Chen et al. | |
| 2020/0037002 A1* | 1/2020 | Xu | H04N 19/18 |
| 2020/0112735 A1* | 4/2020 | Xu | H04N 19/132 |
| 2020/0128265 A1* | 4/2020 | Xu | H04N 19/186 |
| 2020/0137398 A1* | 4/2020 | Zhao | H04N 19/137 |
| 2020/0260070 A1* | 8/2020 | Yoo | H04N 19/176 |
| 2020/0359011 A1* | 11/2020 | Zhao | H04N 19/82 |

OTHER PUBLICATIONS

Taiwan Intellectual Property Office, Office Action for Taiwan Patent Application No. 109135487, dated Aug. 31, 2021.
China National Intellectual Property Administration, International Search Report and Written Opinion or PCT/CN2020/120799, dated Jan. 12, 2021.

* cited by examiner

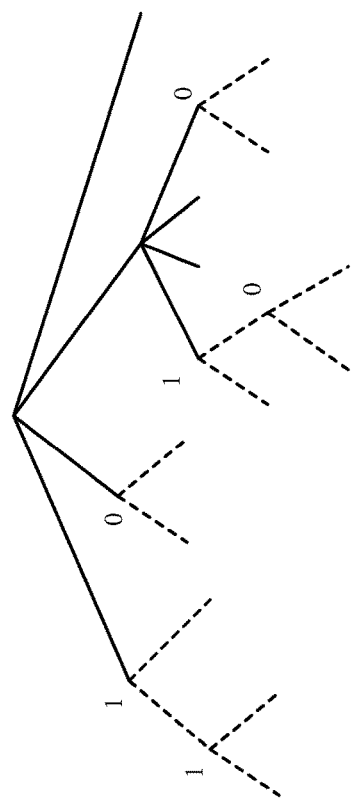
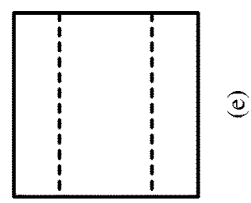
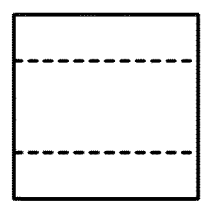
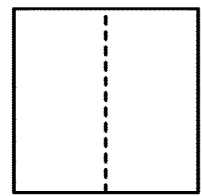
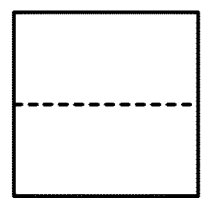
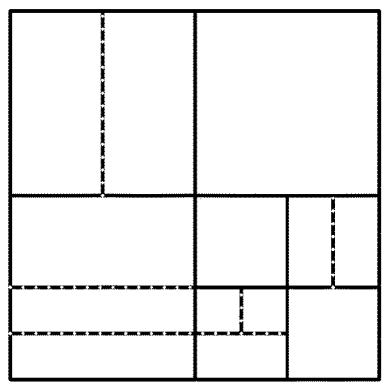
FIG. 5
FIG. 6

SIGNALING BLOCK PARTITIONING OF IMAGE AND VIDEO

INCORPORATION BY REFERENCE

The present disclosure is a continuation of U.S. patent application Ser. No. 17/068,817, filed on Oct. 12, 2020, which is claims the priority benefit of U.S. Provisional Patent Application Nos. 62/914,577, 62/915,049, 62/916,891, 62/930,084, and 62/956,359, filed on 14 Oct. 2019, 15 Oct. 2019, 18 Oct. 2019, 4 Nov. 2019, and 2 Jan. 2020, respectively. Contents of above-listed applications are herein incorporated by reference.

TECHNICAL FIELD

The present disclosure relates generally to the coding of video and images. In particular, the present disclosure relates to methods of signaling partitioning structures of blocks of pixels (e.g., coding units) in coded video or images.

BACKGROUND

Unless otherwise indicated herein, approaches described in this section are not prior art to the claims listed below and are not admitted as prior art by inclusion in this section.

In High-efficiency video coding (HEVC), a coded picture is partitioned into non-overlapped square block regions represented by the coding tree units (CTUs). A coded picture can be represented by a collection of slices, each comprising an integer number of CTUs. The individual CTUs in a slice are processed in a raster scanning order. A bi-predictive (B) slice may be decoded using intra prediction or inter prediction using at most two motion vectors and reference indices to predict the sample values of each block. An intra (I) slice is decoded using intra prediction only. A predictive (P) slice is decoded using intra prediction or inter prediction using at most one motion vector and reference index to predict the sample values of each block.

A CTU can be further partitioned into multiple non-overlapped coding units (CUs) to adapt to various local motion and texture characteristics. A coding tree built on a quadtree (QT) split structure is employed to represent the CU partitions divided from a CTU. Consider the CTU of size M×M pixel samples, where M is one of the values 64, 32, and 16. The CTU can be either comprised of a single unit of the same size M×M, or split into four smaller units with equal size M/2×M/2. The CTU is associated with the root node of a coding tree and the four M/2×M/2 units are the child quadtree nodes split from the root node of a coding tree. Each of four quadtree nodes may become parent node for another split into four child nodes with further reduced size by half in each spatial dimension. The quadtree split can be recursively applied until a leaf is reached. The leaf nodes of a coding tree are associated with the CUs. The minimum and maximum CU sizes may be specified in the sequence parameter set (SPS).

One or more prediction units (PU) may be specified for each CU. The prediction unit, together with the associated CU syntax, works as a basic unit for signaling the predictor information. The specified prediction process is applied to predict the values of the associated pixel samples inside the PU. A CU can be split into one, two, or four PUs, dependent on the selected PU type.

A CU can be further partitioned using the residual quadtree (RQT) structure for representing the associated prediction residual signal. The leaf nodes of the RQT correspond to the resulting transform units (TUs). A transform unit is comprised of a transform block (TB) of luma samples of size 8×8, 16×16, or 32×32 or four transform blocks of luma samples of size 4×4, and two corresponding transform blocks of chroma samples of a picture in 4:2:0 color format. An integer transform is applied to a transform block and quantized coefficient values are coded in the bitstream. The minimum and maximum transform block sizes are specified in the sequence parameter set.

In the HEVC, the terms coding tree block (CTB), coding block (CB), prediction block (PB), and transform block (TB) are defined to refer to the 2-D sample array of one color component from the associated CTU, CU, PU, and TU, respectively. A CTU thus consists of one luma CTB, two chroma CTBs, and associated syntax elements in a color picture not coded using three separate color planes. The signaled coding tree partitioning is generally applied to both luma blocks and chroma blocks, although some exceptions apply when certain minimum size constraints are encountered.

SUMMARY

The following summary is illustrative only and is not intended to be limiting in any way. That is, the following summary is provided to introduce concepts, highlights, benefits and advantages of the novel and non-obvious techniques described herein. Select and not all implementations are further described below in the detailed description. Thus, the following summary is not intended to identify essential features of the claimed subject matter, nor is it intended for use in determining the scope of the claimed subject matter.

Some embodiments of the disclosure provide a video system that applies constraints on block partitioning is provided. The system receives a partitioning control parameter from a bitstream specifying a maximum block size for enabling TT split that is constrained to be 64 or smaller. The system receives data from a bitstream for a block of pixels to be decoded as a current block of a current picture of a video. The system splits the current block into one or more partitions recursively, wherein TT split is disallowed for a partition of the current block unless the partition is less than or equal to the maximum block size. The system reconstructs the one or more partitions of the current block.

In some embodiments, the partitioning control parameter is signaled in a slice header of a slice that includes the current block. The partitioning control parameter may be signaled in a picture header of the current picture. The partitioning control parameter may be signaled in a sequence parameter set (SPS) of a sequence of video pictures that include the current picture. In some embodiments, SPS or picture header sets a default value for the partitioning control parameter that can be overridden by a slice header that includes the current block.

In some embodiments, the partitioning control parameter specifies the maximum block size by referencing a minimum size of a quadtree splitting leaf block, for example, as the difference between (i) a base 2 logarithm of the maximum block size for which a block may be further partitioned by ternary-tree split and (ii) a base 2 logarithm of the minimum size of the quad tree splitting leaf block. The minimum size of a quad tree splitting leaf block is constrained to be a smaller value between 64 and the coding tree block size. The maximum block size for enabling TT split may be further constrained to be less than the coding tree block size.

The minimum size of a quad tree splitting leaf block may be specified by referencing a minimum coding block size, and the minimum size of a quad tree splitting leaf block is specified by using the difference between (i) a base 2 logarithm of the minimum size of a quad tree splitting leaf block and (ii) a base 2 logarithm of the minimum coding block size.

In some embodiments, the maximum block size is determined based on a size of a virtual pipeline data unit (VPDU), and the maximum block size is defined based on ensuring each VPDU can be entirely processed by a same pipeline stage.

BRIEF DESCRIPTION OF THE DRAWINGS

The accompanying drawings are included to provide a further understanding of the present disclosure, and are incorporated in and constitute a part of the present disclosure. The drawings illustrate implementations of the present disclosure and, together with the description, serve to explain the principles of the present disclosure. It is appreciable that the drawings are not necessarily in scale as some components may be shown to be out of proportion than the size in actual implementation in order to clearly illustrate the concept of the present disclosure.

FIG. 5 illustrates an example of block partitioning and its corresponding QTBT.

FIG. 6 illustrates a CU being split into smaller CUs using one of the five split types.

DETAILED DESCRIPTION OF EMBODIMENTS

In the following detailed description, numerous specific details are set forth by way of examples in order to provide a thorough understanding of the relevant teachings. Any variations, derivatives and/or extensions based on teachings described herein are within the protective scope of the present disclosure. In some instances, well-known methods, procedures, components, and/or circuitry pertaining to one or more example implementations disclosed herein may be described at a relatively high level without detail, in order to avoid unnecessarily obscuring aspects of teachings of the present disclosure.

I. Block Partitioning Structures

Figure 1:
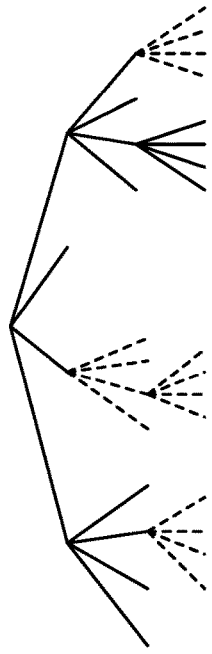
FIG. 1 illustrates a coding tree structure for representing the partitioning of a CTU into the CUs. The solid lines indicate CU boundaries and the dotted lines indicate TU boundaries.
Figure 2:
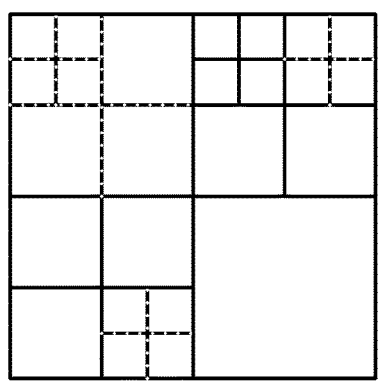
FIG. 2 illustrates eight types of partitioning for dividing a CU into PUs defined in HEVC.
Figure 2:
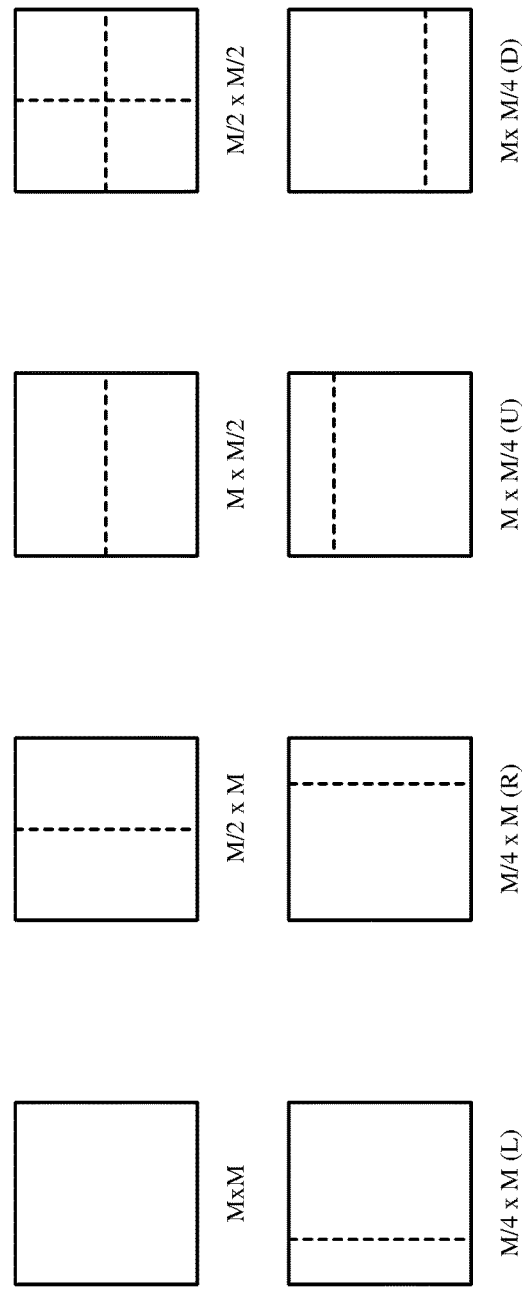

FIG. 1 illustrates a coding tree structure for representing the partitioning of a CTU into the CUs. The solid lines indicate CU boundaries and the dotted lines indicate TU boundaries. FIG. 2 illustrates eight types of partitioning for dividing a CU into PUs defined in HEVC.

a. Binary Tree (BT) Block Partitioning

In some embodiments, binary tree (BT) block partitioning structures are used for partitioning of a block. In a binary tree split structure, a block can be recursively split into two smaller blocks or partitions.

Figure 3:
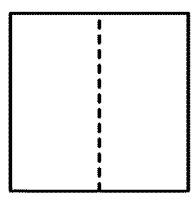
FIG. 3 illustrates several split types of splitting a CU into two partitions, including different symmetric and asymmetric splitting types that may partition the CU vertically or horizontally.
Figure 3:
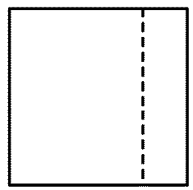
Figure 3:
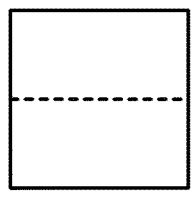
Figure 3:
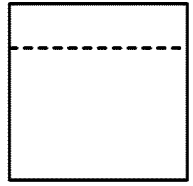

FIG. 3 illustrates several split types of splitting a CU into two partitions, including different symmetric and asymmetric splitting types that may partition the CU vertically or horizontally. For some embodiments, the most efficient and simplest splitting types are the symmetric horizontal and vertical splits, thus, only these two split types are used for binary tree split structure.

For a given block of size M×N, a syntax element bt_split_flag can be signaled to indicate whether to split a block into two smaller blocks. If the flag is true, another syntax element bt_split_mode is signaled to indicate which split type is used (i.e., horizontal or vertical). If the horizontal split is used, the block is split into two smaller blocks of size M×N/2. Otherwise, if the vertical split is used, then the block is split into two smaller blocks of size M/2×N. The binary tree split process can be recursively applied until the current block size (width or height) reaches the minimum block size (width or height) that can be defined in a high-level syntax set such as SPS. Since the binary tree has two split types (i.e., horizontal and vertical), the minimum block width and height may both be indicated. Non-horizontal split is implicit when the split would result in a block height smaller than the indicated minimum. Non-vertical split is implicit when the split would result in a block width smaller than the indicated minimum.

Figure 4:
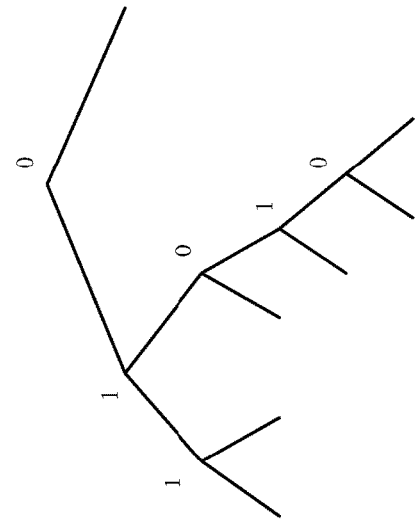
FIG. 4 illustrates an example of block partitioning and its corresponding binary tree.
Figure 4:
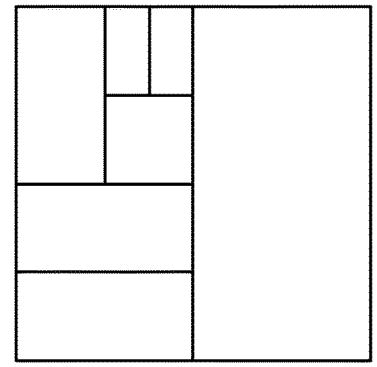

FIG. 4 illustrates an example of block partitioning (left) and its corresponding binary tree (right). For each split (i.e., non-leaf) node of the binary tree, one flag is signaled to indicate which split type (horizontal or vertical) is used, "0" for horizontal split and "1" for vertical split.

b. Quad Tree+Binary Tree (QTBT) Block Partitioning

In some embodiments, a quadtree plus binary tree (QTBT) structure is adopted for partitioning the CUs into smaller CUs. Each CTU can contain one CU or be partitioned into multiple smaller CUs using the quadtree split structure at first. The quadtree split can be recursively applied to the CUs until the current CU size reaches the minimum quadtree leaf node size. If the current quadtree block is not larger than the maximum binary tree root node size, it can be further partitioned using the binary tree split structure. The binary tree split can be recursively applied until the current CU size (width or height) reaches the minimum binary tree leaf node size (width or height) or the current binary tree depth reaches the maximum binary tree depth. There are two split types, symmetric horizontal split and symmetric vertical split. The binary tree leaf nodes are associated with the CUs. For each split (i.e., non-leaf) node of the binary tree, one flag is signaled to indicate which split type (horizontal or vertical) is used. "0" indicates the horizontal split and "1" indicates the vertical split. The minimum quadtree leaf node size, the maximum binary tree root node size, the minimum binary tree leaf node width and height, and the maximum binary tree depth can be indicated in the high-level syntax sets. FIG. 5 illustrates an example of block partitioning (left) and its corresponding QTBT (right). The solid lines indicate quadtree split and the dotted lines indicate binary tree split.

c. Multi-Type-Tree (MTT) Block Partitioning

In a multi-type-tree (MTT) structure, horizontal and vertical center-side ternary trees (TTs) are further added to the QTBT structure for splitting the CUs. FIG. 6 illustrates a CU being split into smaller CUs using one of the five split types. The split types (d) and (e) are referred to as triple-tree or ternary-tree split types and can be employed to divide a block into three smaller blocks, all having reduced sizes in one spatial dimension while keeping the same size in the other spatial dimension. The binary tree depth of a current CU btDepthC in an MTT structure is defined according to:

btDepthC=log 2((widthR*heightR)/
(widthC*heightC)), where widthC and heightC respectively represent the width and the height of the current CU, and widthR and heightR respectively represent the width and the height of the corresponding MTT root node, and the function log 2(x) is a base-2 logarithm of x.

In some embodiments, each coding tree unit (CTU) can be partitioned into one or multiple smaller size CUs by a quadtree with nested multi-type tree using binary and ternary split. A syntax element split_cu_flag is first signaled to indicate whether a current coding unit is further split into more than one coding unit. When split_cu_flag is equal to 0, the current CU is a leaf node and is not further split. Otherwise, the current CU is further partitioned, and a syntax element split_qt_flag is further signaled to indicate whether the current coding unit is partitioned by a quadtree split. When split_qt_flag is equal to 1, the current CU is further partitioned by a quadtree split into four CUs with half horizontal and vertical size. Otherwise, the syntax elements mtt_split_cu_vertical_flag and mtt_split_cu_binary_flag are signaled to indicate the direction (vertical or horizontal) and the type (binary or ternary tree) of the selected MTT split.

II. Constraints on Block Size for Partitioning

Virtual pipeline data units (VPDUs) are defined as non-overlapping M×M-luma (L)/N×N-chroma (C) units in a picture. In hardware decoders, successive VPDUs are processed by multiple pipeline stages at the same time and different stages process different VPDUs simultaneously. The VPDU size is roughly proportional to the buffer size in most pipeline stages. In HEVC hardware decoders, the VPDU size is often set to match the maximum transform block (TB) size, which is referred to as maximum allowed block size, or MaxTbSizeY.

In some embodiments, in order to reduce the VPDU size in coded video, CU partitioning are constrained according to the following: (1) For each VPDU containing one or multiple CUs, the CUs are completely contained in the VPDU. (2) For each CU containing one or more VPDUs, the VPDUs are completely contained in the CU. (3) The processing order of CUs shall not leave a VPDU and re-visit it later. This ensures that each VPDU can be entirely processed by a same pipeline stage.

Figure 7:
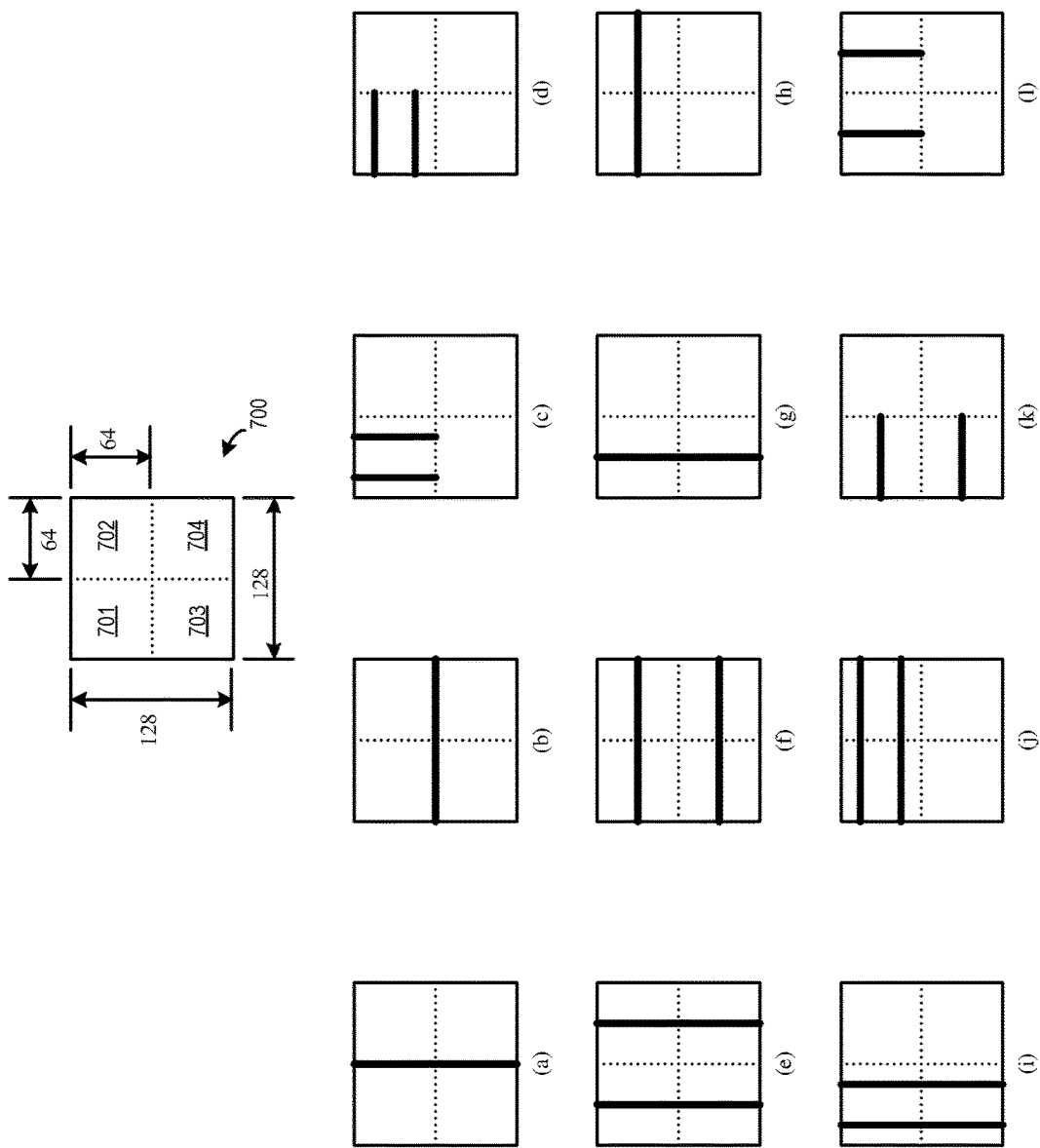
FIG. 7 illustrates compatible and incompatible partitioning structures of a block of pixels when VPDU-based constraints are applied.

FIG. 7 illustrates compatible and incompatible partitioning structures of a block of pixels when VPDU-based constraints are applied. The figure illustrates a block 700 (e.g., a CTU) that can be further partitioned for coding. The size of the block 700 is 128×128 luma samples. The block 700 is processed as four VPDUs 701-704 (divided by dash lines), each VPDU corresponding to a 64×64 luma samples region.

The figure shows several example schemes (a) through (1) for partitioning the block 700 into CUs. Some of the partitioning schemes are compatible with the VPDUs while the others are not. Specifically, partitioning schemes (a), (b), (c), and (d) result in CUs that are compatible with VPDUs, since for each VPDU containing one or multiple CUs, the CUs are completely contained in the VPDU; and for each CU containing one or more VPDUs, the VPDUs are completely contained in the CU. This ensures that no VPDU needs to be partially processed as part of one CU and revisited later as part of another CU.

Partitioning schemes (e), (f), (g), (h), (i), (j), (k), (l) result in CUs that are incompatible with VPDUs, since each of the schemes requires at least one VPDU to be partially processed as part of one CU and revisited later as part of another CU. In other words, there is at least one VPDU that span multiple pipeline stages.

In some embodiments, whether TT split is allowed for a current block is determined based on the VPDU constraints, e.g., the maximum allowed block size due to pipeline limitations. Whether TT split is allowed may be determined based on the following parameters:

a ternary split mode ttSplit
  a coding block width cbWidth in luma samples,
  a coding block height cbHeight in luma samples,
  a location (x0, y0) of the top-left luma sample of the considered coding block relative to the top-left luma sample of the picture,
  a multi-type tree depth mttDepth
  a maximum multi-type tree depth with offset maxMtt-Depth,
  a maximum ternary tree size maxTtSize,
  a variable treeType specifying whether a single tree (SINGLE_TREE) or a dual tree is used to partition the coding tree node and, when a dual tree is used, whether the luma (DUAL_TREE_LUMA) or chroma components (DUAL_TREE_CHROMA) are currently processed,
  a variable modeType specifying whether intra (MODE_INTRA), IBC (MODE_IBC), and inter coding modes can be used (MODE_TYPE_ALL), or whether only intra and IBC coding modes can be used (MODE_TYPE_INTRA), or whether only inter coding modes can be used (MODE_TYPE_INTER) for coding units inside the coding tree node.

These parameters are used to determine a variable "allowTtSplit". The variable cbSize is derived based on ttSplit according to the following:

|  | ttSplit == SPLIT_TT_VER | ttSplit == SPLIT_TT_HOR |
| --- | --- | --- |
| cbSize | cbWidth | cbHeight |

The variable allowTtsplit is derived according to the following: (with the VPDU size indicated by MaxTbSizeY)
  If one or more of the following conditions are true, allowTtSplit is set equal to FALSE:
    cbSize is less than or equal to 2*MinTtSizeY
    cbWidth is greater than Min(MaxTbSizeY, maxTtSize)
    cbHeight is greater than Min(MaxTbSizeY, maxTtSize)
    mttDepth is greater than or equal to maxMttDepth x0+cbWidth is greater than pic_width_in_luma_samples y0+cbHeight is greater than pic_height_in_luma_samples treeType is equal to DUAL_TREE_CHROMA and (cbWidth/SubWidthC)*(cbHeight/SubHeightC) is less than or equal to 32 treeType is equal to DUAL_TREE_CHROMA and (cbWidth/SubWidthC) is equal to 8 and ttSplit is equal to SPLIT_TT_VER treeType is equal to DUAL_TREE_CHROMA and modeType is equal to MODE_TYPE_INTRA cbWidth*cbHeight is equal to 64 and modeType is equal to MODE_TYPE_INTER Otherwise, allowTtSplit is set equal to TRUE.

In some embodiments, high-level syntax parameters related to the CU partitioning structure are specified based on the restrictions on pipeline processing, i.e., VPDU related constraints (e.g., maximum allowed block size) are enforced when partitioning CUs. In some embodiments, a video coding system may include one or more syntax elements for deriving the value of the maximum allowed block size for enabling TT split in the associated data structure.

In some embodiments, the value of the maximum allowed block size for enabling TT split is constrained for bitstream conformance requirement. Thus, in order to determine whether TT split is allowed for a current CU, a video coding system may only test whether the width or the height of the current CU is greater than the maximum allowed block size for enabling TT split and does not further test against the VPDU size for each current CU. For example, when the VPDU size is equal to 64, a video coding system may constrain the maximum allowed block size for enabling TT split signaled in a bitstream to be less than or equal to 64.

In some embodiments, the parameter maxTtSize is constrained to be less than or equal to 64, where the variable maxTtSize is derived from one or more the coded syntax element values that indicate the maximum allowed block size for enabling TT split. In some embodiments, the variable maxTtSize is derived from a coded high-level syntax element log 2_diff_max_tt_min_tt according to maxTtSize=1<<(log 2_diff_max_tt_min_tt+log 2 MinMaxTT)

under the constraint that the allowed maximum value of log 2_diff_max_tt_min_tt equal to Min(6, Ctb Log 2SizeY)—log 2MinMaxTT. The variable log 2MinMaxTT indicates the base 2 logarithm of the allowed minimum value of the max TT size and Ctb Log 2SizeY indicates the base 2 logarithm of the specified CTB size.

The process for determining whether TT split is allowed for a current CU can be further simplified. Thus, the variable allowTtSplit is derived as followed:

If one or more of the following conditions are true, allowTtSplit is set equal to FALSE:

cbSize is less than or equal to 2*MinTtSizeY cbWidth is greater than maxTtSize cbHeight is greater than maxTtSize mttDepth is greater than or equal to maxMttDepth x0+cbWidth is greater than pic_width_in_luma_samples y0+cbHeight is greater than pic_height_in_luma_samples treeType is equal to DUAL_TREE_CHROMA and (cbWidth/SubWidthC)*(cbHeight/SubHeightC) is less than or equal to 32 treeType is equal to DUAL_TREE_CHROMA and (cbWidth/SubWidthC) is equal to 8 and ttSplit is equal to SPLIT_TT_VER treeType is equal to DUAL_TREE_CHROMA and modeType is equal to MODE_TYPE_INTRA cbWidth*cbHeight is equal to 64 and modeType is equal to MODE_TYPE_INTER Otherwise, allowTtSplit is set equal to TRUE.

In order to meet the VDPU constraint, in some embodiments, the variables minQtSizeY and minQtSizeC are derived from one or more the coded syntax element values that indicate the minimum allowed block size for a QT leaf node for luma and chroma, respectively, and the values of variables minQtSizeY and minQtSizeC are constrained to be less than or equal to 64 in an intra slice when the intra dual tree mode is enabled. In some embodiments, the values of the variable minQtSizeY and minQtSizeC are constrained to be less than or equal to Min(64, CtbSizeY) in an intra slice when the intra dual tree mode is enabled, where the variables minQtSizeY and minQtSizeC derived from one or more the coded syntax element values indicate the minimum allowed block size in luma samples for a QT leaf node for luma and chroma, respectively, and the variable CtbSizeY indicates the CTB size in luma samples in a coded video sequence.

In some embodiments, when the intra dual tree mode is enabled, a current CU with size greater than 64 can be further partitioned into smaller CUs (that are) each contained within VPDU regions by quadtree split.

In some embodiments, the values of the variable minQtSizeY and minQtSizeC are constrained to be less than or equal to Min(64, CtbSizeY) for all slice types. As such, when a current CU with size greater than 64 is partially across (or span across) the right or bottom picture boundary, the current CU can be further split into smaller CUs by quadtree split.

III. Constraints on Partitioning Depth

In some embodiments, constraint parameters related to the maximum MTT depth are specified. The constraint parameters are for controlling the CU partitioning structure based on quadtree with nested multi-type tree using binary split and/or ternary split. According to one aspect of the present disclosure, the maximum MTT depth is constrained to be greater than 0 when the minimum QT size is greater than the minimum coding block size. In some embodiments, the maximum MTT depth is constrained to be greater than 0 when the minimum QT size is greater than the minimum coding block size.

In some embodiments, a SPS syntax element log 2_ctu_size_minus5 plus 5 specifies (the base 2 logarithm of) the luma coding tree block size of each CTU. The syntax element log 2_ctu_size_minus5 can be used to derive variables Ctb Log 2SizeY and CtbSizeY according to the following:

Ctb Log 2SizeY=log 2_ctu_size_minus5+5

CtbSizeY=1<<Ctb Log 2SizeY

In some embodiments, the SPS syntax element log 2_min_luma_coding_block_size_minus2 plus 2 specifies the base 2 logarithm of the minimum luma coding block size. The syntax element log 2_min_luma_coding_block_size_minus2 can be used to derive the minimum size of a CB in luma samples, denoted as MinCb Log 2SizeY or MinCbSizeY. In some embodiments, MinCbSizeY is constrained to be less than or equal to Min (64, CtbSizeY). MinCb Log 2SizeY and MinCbSizeY can be derived according to the following:

MinCb Log 2SizeY=log 2_min_luma_coding_
   block_size_minus2+2

MinCbSizeY=1<<MinCb Log 2SizeY

In some embodiments, the slice header (SH) syntax element slice_log 2_diff_min_qt_min_cb_luma specifies the difference between the base 2 logarithm of the minimum size in luma samples of a luma leaf block resulting from QT splitting of a CTU and the base 2 logarithm of the minimum coding block size in luma samples for luma CUs in the current slice.

In some embodiments, the slice header (SH) syntax element slice_max_mtt_hierarchy_depth_luma specifies the maximum hierarchy depth for coding units resulting from multi-type tree splitting of a quadtree leaf in the current slice. When slice_max_mtt_hierarchy_depth_luma is non-zero, syntax elements slice_log 2_diff_max_bt_min_qt_luma and slice_log 2_diff_max_tt_min_qt_luma are coded in the current slice header. The slice header syntax element slice_log 2_diff_max_bt_min_qt_luma specifies the difference between (the base 2 logarithm of) the maximum size (width or height in luma samples) of a luma coding block that can be split using a binary split and (the base 2 logarithm of) the minimum size (width or height in luma samples) of a luma leaf block resulting from quadtree splitting of a CTU in the current slice. The SH syntax element slice_log 2_diff_max_tt_min_qt_luma specifies the difference between (the base 2 logarithm of) the maximum size (width or height in luma samples) of a luma coding block that can be split using a ternary split and (the base 2 logarithm of) the minimum size (width or height in luma samples) of a luma leaf block resulting from quadtree splitting of a CTU in the current slice.

A variable MinQt Log 2SizeY or MinQtSizeY indicates the minimum size in luma samples of a luma leaf block resulting from QT splitting of a CTU. The values of slice_log 2_diff_max_bt_min_qt_luma and slice_log 2_diff_max_tt_min_qt_luma are constrained to be in the range of 0 to Ctb Log 2SizeY—MinQt Log 2SizeY, inclusive. The value of MinQtSizeY is constrained to be in range of (MinCbSizeY, Min(64,CtbSizeY)), inclusive.

The syntax element slice_log 2_diff_min_qt_min_cb_luma can be used to derive the variable MinQt Log 2SizeY and MinQtSizeY according to the following:

MinQt Log 2SizeY=MinCb Log 2SizeY+slice_log
   2_diff_min_qt_min_cb_luma

MinQtSizeY=1<<MinQt Log 2SizeY

Since the value of MinQtSizeY is constrained to be in range of (MinCbSizeY, Min(64,CtbSizeY)), the range of slice_log 2_diff_min_qt_min_cb_luma is 0 to Min(6,Ctb Log 2SizeY)—MinCb Log 2SizeY, inclusive.

The variable MaxBtSizeY indicates the maximum size in luma samples of a luma coding block that can be split using a binary split. The variable MaxBtSizeY is derived as follows:

MaxBtSizeY=1<<(MinQt Log 2SizeY+slice_log
   2_diff_max_bt_min_qt_luma)

In some embodiments, the maximum BT size is constrained to be greater than or equal to the minimum QT size. In this way, when a current coding block (as result of partitioning) reaches the minimum QT size, the coding block can be further recursively partitioned using a binary split until the current coding block is equal to the minimum coding block size. In some embodiments, the maximum TT size is constrained to be greater than or equal to the minimum QT size. In this way, when a current coding block (as result of partitioning) reaches the minimum QT size, the coding block can be further recursively partitioned using a ternary split until the current coding block is equal to the minimum coding block size.

A variable MaxTtSizeY indicating the maximum size in luma samples of a luma coding block that can be split using a ternary split. The variable MaxTtSizeY can be derived from the syntax element slice_log 2_diff_max_tt_min_qt_luma as follows:

MaxTtSizeY=1<<(MinQt Log 2SizeY+slice_log
   2_diff_max_tt_min_qt_luma)

Since MaxTtSizeY is in range of MinQtSize to Min (64, CtbSizeY), slice_log 2_diff_max_tt_min_qt_luma is in range of 0 to Min(6,Ctb Log 2SizeY)—MinQt Log 2SizeY.

In some embodiments, slice header syntax elements slice_log 2_diff_min_qt_min_cb_chroma, slice_log 2_diff_max_bt_min_qt_chroma, and slice_log 2_diff_max_tt_min_qt_chroma respectively specifies the minimum QT size, the maximum BT size, and the maximum TT size (in luma samples) of a chroma coding block. In some embodiments, the default values of these SH syntax elements are specified by related corresponding syntax elements in the SPS. For example, in some embodiments, there can be corresponding SPS parameters sps_log 2_diff_min_qt_min_cb_chroma, sps_log 2_diff_max_bt_min_qt_chroma, and sps_log 2_diff_max_tt_min_qt_chroma that respectively specifies the minimum QT size, the maximum BT size, and the maximum TT size (in luma samples) of a chroma coding block at SPS level.

In some embodiments, the derived maximum BT size and maximum TT size can be greater than or equal to the minimum QT size. Thus, when a current coding block reaches the minimum QT size and binary or ternary split is enabled, the current coding block can be further recursively partitioned using binary or ternary split until the current coding block is equal to the minimum coding block size. However, when slice_max_mtt_hierarchy_depth_luma is equal to 0, both binary split and ternary split are disabled. In some embodiments, no coding block can be split into the minimum coding block if the minimum QT size is greater than the minimum coding block size, since that may causes a problem for partitioning the CUs along picture boundaries, where each out-of-bound CU is required to be further recursively partitioned until the entire CU is within the picture boundaries. In some embodiment, the syntax slice_max_mtt_hierarchy_depth_luma is constrained to be greater than 0 when slice_log 2_diff_min_qt_min_cb_luma is non-zero.

Figure 8:
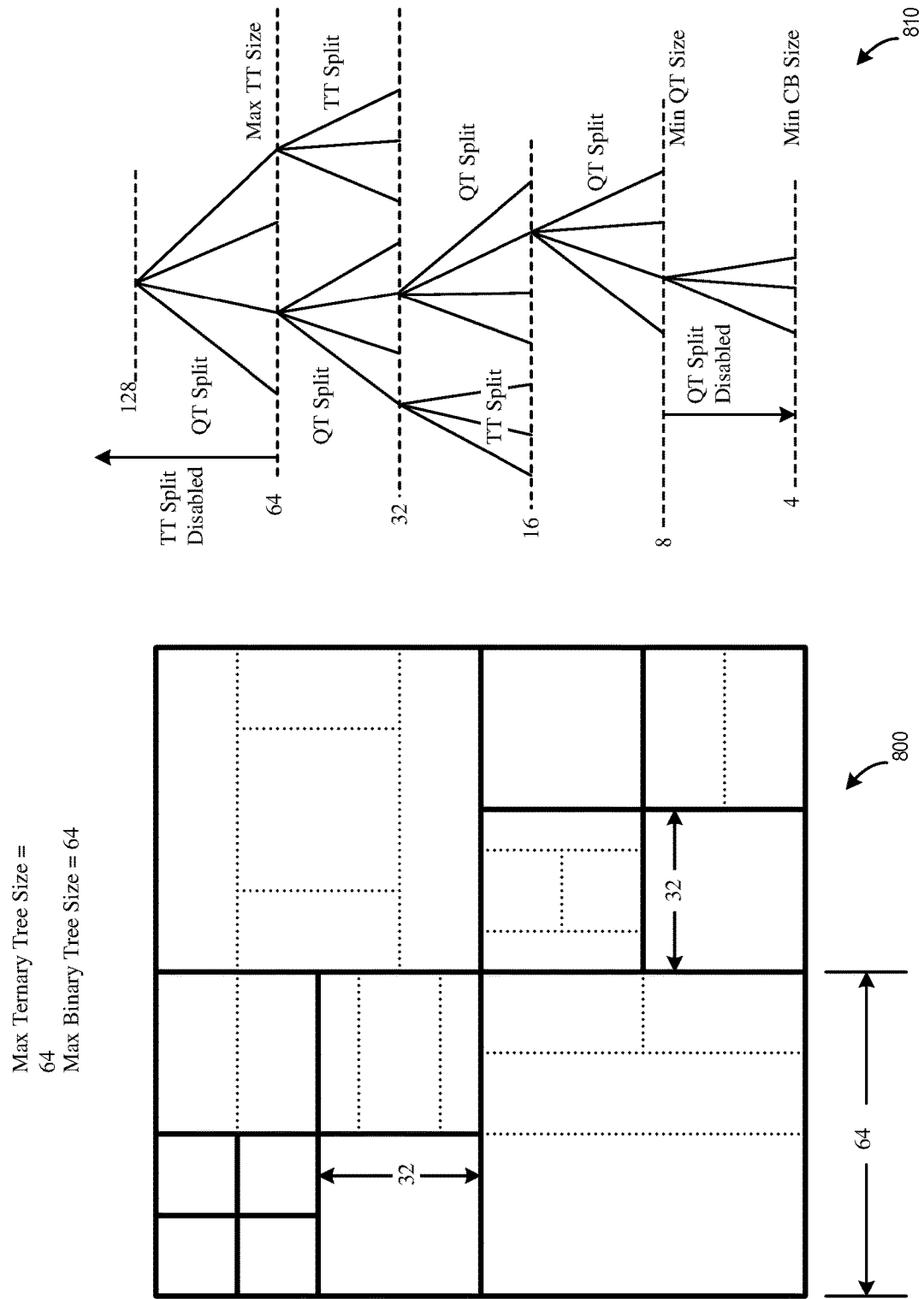
FIG. 8 conceptually illustrates constraint parameters for controlling the partitioning structure of a pixel block.

FIG. 8 conceptually illustrates constraint parameters for controlling the partitioning structure of a pixel block 800. The pixel block 800 is a CTU that is partitioned by using both QT and MTT. The figure illustrates the CTU 800 along with a tree 810 that shows portions of the partitioning structure of the CTU 800.

The size of the CTU 800 is 128×128. The CTU 800 is constrained to disallow MTT (e.g., TT) splitting for partitions having a size greater than 64. In other word, the MTT splitting is not allowed for the CTU 800, but MTT splitting is allowed for QT partitions of the CTU 800 that are 64×64 or smaller. This maximum allowed block size for MTT may be determined based on a size of a VPDU in order to ensure that each VPDU can be entirely processed by a same pipeline stage.

The maximum allowed size for MTT (e.g., variables MaxBtSizeY or MaxTtSizeY) may also be signaled by referencing a minimum size of a QT leaf (variable minQt-SizeY). For example, the maximum allowed size for MTT can be expressed as a difference between the base two logarithm of MaxTtSizeY and the base two logarithm of MinQtSizeY, e.g., as slice_log 2_diff_max_tt_min_qt_luma or a corresponding signal in picture header or SPS. The minimum size of the QT leaf may be signaled by referencing a minimum size of a CB (variable MinCbSizeY). For example, minimum size of the QT leaf can be expressed as a difference between the base two logarithm of MinQtSizeY and the base two logarithm of MinCbSizeY, e.g., as slice_log 2_diff_min_qt_min_cb_luma or a corresponding signal in picture header or SPS.

IV. Signaling Block Partitioning Structure

In some embodiments, information on the maximum MTT depth is signaled based on the difference between the base 2 logarithm of the minimum QT size and the base 2 logarithm of the minimum coding block size. In some embodiments, a variable MaxMttDepthY indicates the maximum hierarchy depth for coding units resulting from multi-type tree splitting of a quadtree leaf, in the range of (0, 2*(Ctb Log 2SizeY—MinCb Log 2SizeY)), inclusive. The variable MaxMttDepthY can be derived as follows:

MaxMttDepthY=slice_max_mtt_hierarchy_depth_luma+((1+slice_log 2_diff_min_qt_min_cb_luma)>>1).

In some embodiments, constraint parameters for controlling the CU partitioning structure are specified. In some embodiments, when a current coding block reaches (or has) the minimum QT size, it is allowed to be further partitioned recursively until the minimum coding block size as long as at least one of the MTT split types (BT and TT) is still enabled. A video coder may signal the maximum BT size or the maximum TT size to be less than the minimum QT size, with at least one of the maximum BT size and the maximum TT size is constrained to be greater than or equal to the minimum QT size when the current MTT depth is nonzero. As such, the specified MTT structure may disable one of the MTT split type for coding blocks greater than a size constraint that is less than the minimum QT size. In particular, a video coder may disable only one of the MTT types by specifying a corresponding size constraint equal to the minimum coding block size.

In some embodiment, a first syntax element signaling the maximum size for the first MTT type specifies the difference between (the base 2 logarithm of) the maximum size in luma samples for the first MTT type and (the base 2 logarithm of) the minimum coding block size in luma samples for luma CUs in the current slice. When the maximum size for the first MTT type is less than the minimum QT size and the minimum QT size is greater than the minimum coding block size, a second syntax element signaling the maximum size for the second MTT type specifies the difference between (the base 2 logarithm of) the maximum size in luma samples for the first MTT type and (the base 2 logarithm of) the minimum size (width or height) in luma samples of a luma leaf block resulting from quadtree splitting of a CTU in the current slice. Otherwise, the second syntax element signaling the maximum size for the second MTT type specifies the difference between (the base 2 logarithm of) the maximum size in luma samples for the second MTT type and (the base 2 logarithm of) the minimum coding block size in luma samples for luma CUs in the current slice.

Table 1 provides an example syntax table of a slice header (SH) for specifying block partitioning structure. The syntax allows one of the MTT types with a specified max size less than the minimum QT size.

TABLE 1

| slice_header( ) { | Descriptor |
|---|---|
| .... | |
| if( partition_constraints_override_enabled_flag ) { | |
|   partition_constraints_override_flag | ue(v) |
|   if( partition_constraints_override_flag ) { | |
|     slice_log2_diff_min_qt_min_cb_luma | ue(v) |
|     slice_max_mtt_hierarchy_depth_luma | ue(v) |
|     if( slice_max_mtt_hierarchy_depth_luma != 0 ) { | |
|       slice_log2_max_bt_luma | ue(v) |
|       slice_log2_max_tt_luma | ue(v) |
|     } | |
|     if( slice_type = = 1 && qtbtt_dual_tree_intra_flag ) { | |
|       slice_log2_diff_min_qt_min_cb_chroma | ue(v) |
|       slice_max_mtt_hierarchy_depth_chroma | ue(v) |
|       if( slice_max_mtt_hierarchy_depth_chroma != 0 ) { | |
|         slice_log2_max_bt_chroma | ue(v) |
|         slice_log2_max_tt_chroma | ue(v) |
|       } | |
|     } | |
|   } | |
| } | |
| .... | |

The variables MaxBtSizeY and MaxTtSizeY are derived according of the following:

MaxBtSizeY=1<<(MinCb Log 2SizeY+slice_log 2_max_bt_luma)

MaxTtSizeY=1<<(((MaxBtSizeY<MinQtSizeY && MinQt Log 2SizeY>MinCb Log 2SizeY) ?MinQt Log 2SizeY:MinCb Log 2SizeY)+slice_log 2_max_tt_luma).

In some other embodiments, the variables MaxBtSizeY and MaxTtSizeY are derived according to the following:

MaxBtSizeY=1<<(MinCb Log 2SizeY+slice_log 2_max_bt_luma)

MaxTtSizeY=1<<(((MaxBtSizeY<MinQtSizeY) ?MinQt Log 2SizeY:MinCb Log 2SizeY)+slice_log 2_max_tt_luma).

In some other embodiments, the first syntax element signaling the maximum size for the first MTT type specifies the difference between the base 2 logarithm of the maximum size in luma samples for the first MTT type and the base 2 logarithm of the minimum coding block size in luma samples for luma CUs in the current slice. The second syntax element signaling the maximum size for the second MTT type specifies the difference between the base 2 logarithm of the maximum size in luma samples for the second MTT type and the base 2 logarithm of the minimum coding block size in luma samples for luma CUs in the current slice. The variables MaxBtSizeY and MaxTtSizeY are derived according to the following:

MaxBtSizeY=1<<(MinCb Log 2SizeY+slice_log 2_max_bt_luma)

MaxTtSizeY=1<<(MinCb Log 2SizeY+slice_log 2_max_tt_luma).

In some embodiments, at least one value of the variables MaxBtSizeY and MaxBtSizeY is constrained to be greater than or equal to MinQtSizeY.

It is noted that the proposed method and the related embodiments can be further applied to specify other related syntax elements to signal the maximum BT size and the maximum TT size for splitting chroma coding blocks in a slice header for a Intra slice when the dual-tree partitioning mode is enabled (qtbtt_dual_tree_intra_flag equal to 1). The proposed method and the related embodiments can be further applied to specify other related syntax elements to signal the default maximum BT size and the default maximum TT size in a SPS.

In some embodiments, when a current coding block reaches the minimum QT size, it is allowed to be further partitioned recursively until the minimum coding block size is reached (by e.g., enabling binary or ternary split for coding block size less than or equal to the minimum QT size without any restriction on the maximum size for the binary or ternary split.) In some embodiments, a video coder may signal the maximum TT size to be less than the minimum QT size under the constraint that the maximum BT size is greater than or equal to the minimum QT size. As such, the specified MTT structure may disable the ternary split for the coding blocks with sizes greater than the specified size constraint that is less than the minimum QT size. Specifically, a video coder can effectively disable the ternary split by specifying the corresponding maximum size constraint to be equal to the minimum coding block size.

In some embodiments, a syntax element signaling the maximum size (width or height) for the binary split type specifies the difference between (the base 2 logarithm of) the maximum size (in luma samples) of a luma coding block that can be split using a binary split and (the base 2 logarithm of) the minimum coding block size (width or height in luma samples) of a luma leaf block (which results from quadtree splitting of a CTU in the current slice). Another syntax element signaling the maximum size for the ternary type specifies the difference between (the base 2 logarithm of) the maximum size (width or height in luma samples) of a luma coding block that can be split using a ternary split and (the base 2 logarithm of) the minimum coding block size in luma samples for luma CUs in the current slice. Table 2 provides an example syntax table of a slice header that can support the ternary split type with a specified max size less than the minimum QT size.

TABLE 2

| slice_header( ) { | Descriptor |
|---|---|
| .... | |
| if( partition_constraints_override_enabled_flag ) { | |
|   partition_constraints_override_flag | ue(v) |
|   if( partition_constraints_override_flag ) { | |
|     slice_log2_diff_min_qt_min_cb_luma | ue(v) |
|     slice_max_mtt_hierarchy_depth_luma | ue(v) |
|     if( slice_max_mtt_hierarchy_depth_luma != 0 ) { | |
|       slice_log2_diff_max_bt_min_qt_luma | ue(v) |
|       slice_log2_diff_max_tt_min_cb_luma | ue(v) |
|     } | |
|     if( slice_type = = 1 && qtbtt_dual_tree_intra_flag ) { | |
|       slice_log2_diff_min_qt_min_cb_chroma | ue(v) |
|       slice_max_mtt_hierarchy_depth_chroma | ue(v) |
|       if( slice_max_mtt_hierarchy_depth_chroma != 0 ) { | |
|         slice_log2_diff_max_bt_min_qt_luma | ue(v) |
|         slice_log2_diff_max_tt_min_cb_luma | ue(v) |
|       } | |
|     } | |
|   } | |
| } | |
| .... | |
| } | |

The variables MaxBtSizeY indicates the maximum size of a luma CB allowing BT split. The variable MaxTtSizeY indicates the maximum size of a luma CB allowing TT split. MaxBtSizeY and MaxTtSizeY are in range of MinQtSize to Min(64, CtbSizeY), inclusive. MaxBtSizeY and MaxTtSizeY are derived as follows:

MaxBtSizeY=1<<(MinQt Log 2SizeY+slice_log 2_diff_max_bt_min_qt_luma)

MaxTtSizeY=1<<(MinCb Log 2SizeY+slice_log 2_diff_min_tt_min_cb_luma).

The variables MaxBtSizeC indicates the maximum size of a chroma CB allowing BT split. The variable MaxTtSizeY indicates the maximum size of a chroma CB allowing TT split. The variables MaxBtSizeC and MaxTtSizeC are derived as follows:

MaxBtSizeC=1<<(MinQt Log 2SizeC+slice_log 2_diff_max_bt_min_qt_chroma)

MaxTtSizeC=1<<(MinCb Log 2SizeY+slice_log 2_diff_min_tt_min_cb_chroma).

It is noted that the methods and the related embodiments described in Sections II through IV can be further applied to other related syntax elements for signaling the information for deriving the maximum MTT depth for splitting chroma coding blocks in a slice header for a Intra slice when the dual-tree partitioning mode is enabled (qtbtt_dual_tree_intra_flag equal to 1). The proposed methods can also be applied to signaling the related constraint parameters in a picture header. The proposed method and the related embodiments can also applied to other related syntax elements for signalling the information for deriving the default maximum MTT depth in a SPS. For example, there can be picture header parameters and SPS parameters that correspond to slice header parameters such as slice_log 2_diff_max_tt_min_qt_luma and slice_log 2_diff_min_qt_min_cb_luma that set default values for these parameters at sequence or picture level.

Any of the foregoing proposed methods can be implemented in encoders and/or decoders. For example, any of the proposed methods can be implemented in an entropy encoding (or high-level syntax encoding) module of an encoder, and/or an entropy decoding (or high-level syntax decoding) module of a decoder. Alternatively, any of the proposed methods can be implemented as a circuit integrated to the entropy encoding (or high-level syntax encoding) module of the encoder and/or the entropy decoding (or high-level syntax decoding) module of the decoder. Any of the foregoing proposed methods can also be implemented in image encoders and/or decoders, wherein the resulting bitstream corresponds to one coded frame only using intra-picture prediction.

V. Example Video Encoder

Figure 9:
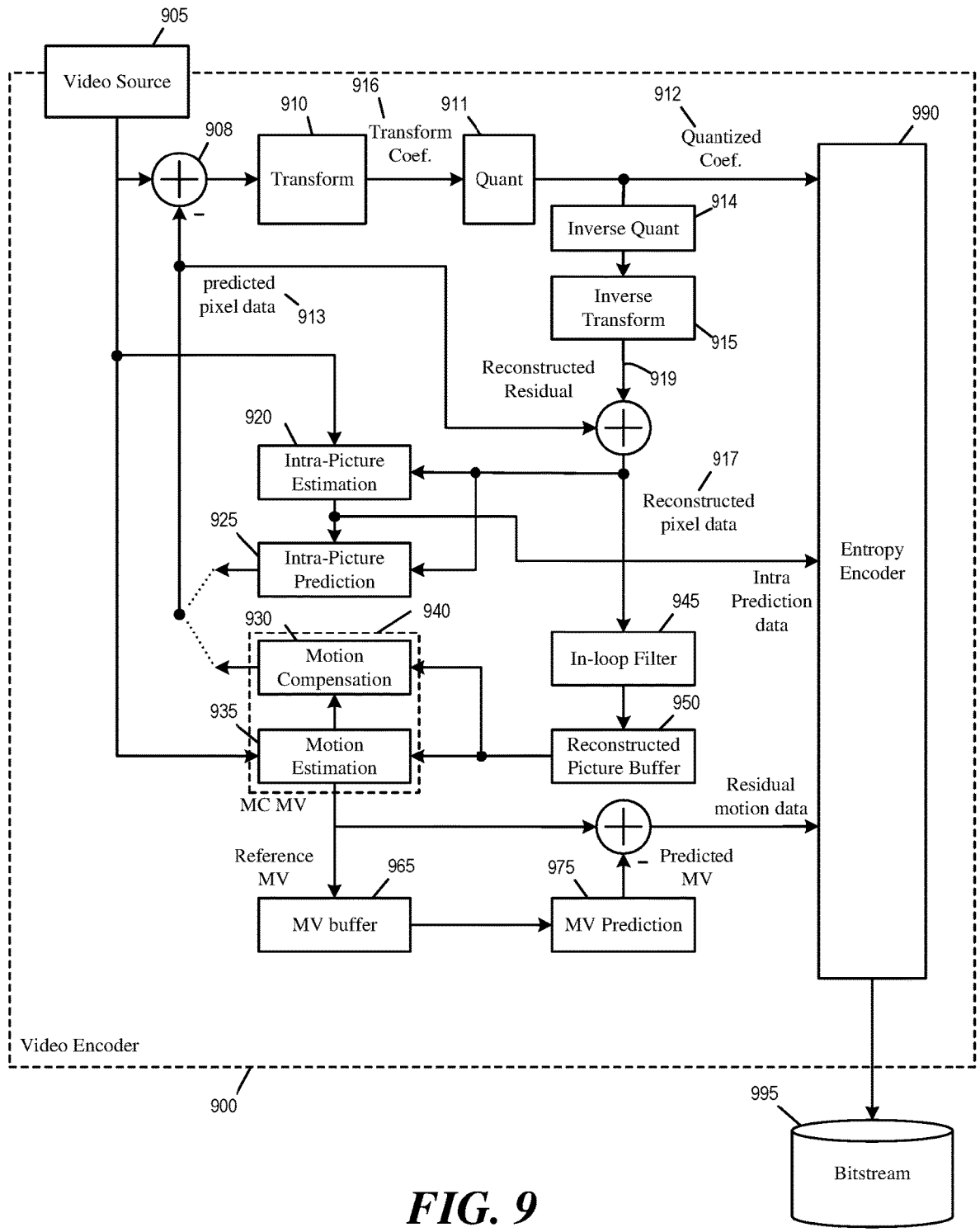
FIG. 9 illustrates an example video encoder that signals constraints on block partitioning.

FIG. 9 illustrates an example video encoder 900 that signals constraints on block partitioning. As illustrated, the video encoder 900 receives input video signal from a video source 905 and encodes the signal into bitstream 995. The video encoder 900 has several components or modules for encoding the signal from the video source 905, at least including some components selected from a transform module 910, a quantization module 911, an inverse quantization module 914, an inverse transform module 915, an intra-picture estimation module 920, an intra-prediction module 925, a motion compensation module 930, a motion estimation module 935, an in-loop filter 945, a reconstructed picture buffer 950, a MV buffer 965, and a MV prediction module 975, and an entropy encoder 990. The motion compensation module 930 and the motion estimation module 935 are part of an inter-prediction module 940.

In some embodiments, the modules 910-990 are modules of software instructions being executed by one or more processing units (e.g., a processor) of a computing device or electronic apparatus. In some embodiments, the modules 910-990 are modules of hardware circuits implemented by one or more integrated circuits (ICs) of an electronic apparatus. Though the modules 910-990 are illustrated as being separate modules, some of the modules can be combined into a single module.

The video source 905 provides a raw video signal that presents pixel data of each video frame without compression. A subtractor 908 computes the difference between the raw video pixel data of the video source 905 and the predicted pixel data 913 from the motion compensation module 930 or intra-prediction module 925. The transform module 910 converts the difference (or the residual pixel data or residual signal 909) into transform coefficients (e.g., by performing Discrete Cosine Transform, or DCT). The quantization module 911 quantizes the transform coefficients into quantized data (or quantized coefficients) 912, which is encoded into the bitstream 995 by the entropy encoder 990.

The inverse quantization module 914 de-quantizes the quantized data (or quantized coefficients) 912 to obtain transform coefficients, and the inverse transform module 915 performs inverse transform on the transform coefficients to produce reconstructed residual 919. The reconstructed residual 919 is added with the predicted pixel data 913 to produce reconstructed pixel data 917. In some embodiments, the reconstructed pixel data 917 is temporarily stored in a line buffer (not illustrated) for intra-picture prediction and spatial MV prediction. The reconstructed pixels are filtered by the in-loop filter 945 and stored in the reconstructed picture buffer 950. In some embodiments, the reconstructed picture buffer 950 is a storage external to the video encoder 900. In some embodiments, the reconstructed picture buffer 950 is a storage internal to the video encoder 900.

The intra-picture estimation module 920 performs intra-prediction based on the reconstructed pixel data 917 to produce intra prediction data. The intra-prediction data is provided to the entropy encoder 990 to be encoded into bitstream 995. The intra-prediction data is also used by the intra-prediction module 925 to produce the predicted pixel data 913.

The motion estimation module 935 performs inter-prediction by producing MVs to reference pixel data of previously decoded frames stored in the reconstructed picture buffer 950. These MVs are provided to the motion compensation module 930 to produce predicted pixel data.

Instead of encoding the complete actual MVs in the bitstream, the video encoder 900 uses MV prediction to generate predicted MVs, and the difference between the MVs used for motion compensation and the predicted MVs is encoded as residual motion data and stored in the bitstream 995.

The MV prediction module 975 generates the predicted MVs based on reference MVs that were generated for encoding previously video frames, i.e., the motion compensation MVs that were used to perform motion compensation. The MV prediction module 975 retrieves reference MVs from previous video frames from the MV buffer 965. The video encoder 900 stores the MVs generated for the current video frame in the MV buffer 965 as reference MVs for generating predicted MVs.

The MV prediction module 975 uses the reference MVs to create the predicted MVs. The predicted MVs can be computed by spatial MV prediction or temporal MV prediction. The difference between the predicted MVs and the motion compensation MVs (MC MVs) of the current frame (residual motion data) are encoded into the bitstream 995 by the entropy encoder 990.

The entropy encoder 990 encodes various parameters and data into the bitstream 995 by using entropy-coding techniques such as context-adaptive binary arithmetic coding (CABAC) or Huffman encoding. The entropy encoder 990 encodes various header elements, flags, along with the quantized transform coefficients 912, and the residual motion data as syntax elements into the bitstream 995. The bitstream 995 is in turn stored in a storage device or transmitted to a decoder over a communications medium such as a network.

The in-loop filter 945 performs filtering or smoothing operations on the reconstructed pixel data 917 to reduce the artifacts of coding, particularly at boundaries of pixel blocks. In some embodiments, the filtering operation performed includes sample adaptive offset (SAO). In some embodiment, the filtering operations include adaptive loop filter (ALF).

Figure 10:
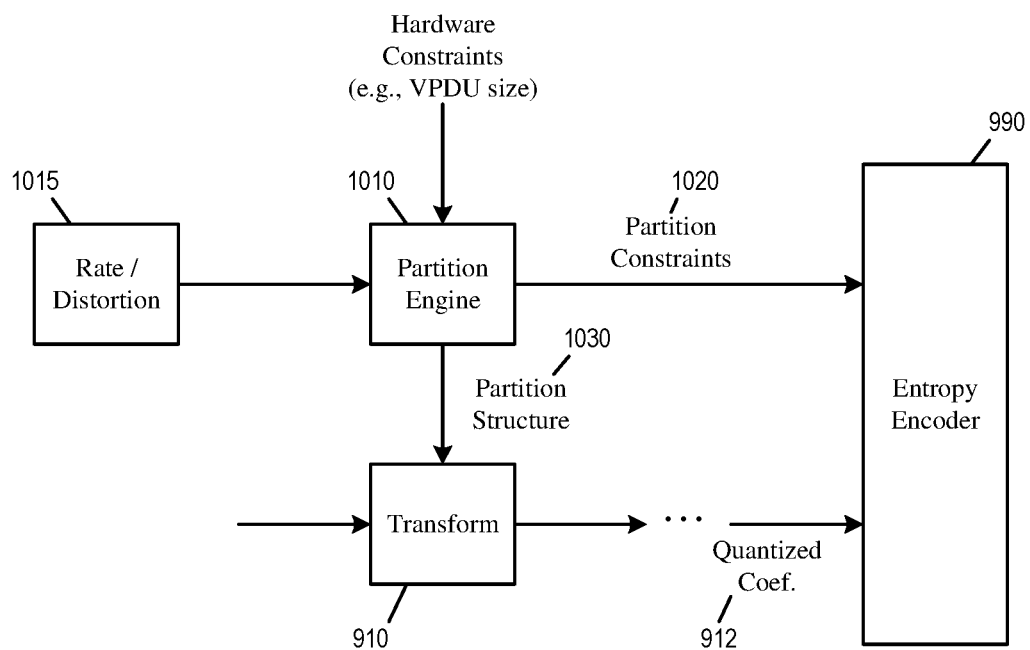
FIG. 10 illustrates portions of the video encoder that implement block partitioning constraints.

FIG. 10 illustrates portions of the video encoder 900 that implement block partitioning constraints. Specifically, a partition engine 1010 generates a set of partitioning constraints 1020 for the entropy encoder 990 based on a set of hardware constraints (e.g., VPDU size) and rate/distortion information 1015. The entropy encoder 990 encodes or signals the set of partitioning constraints 1020 into the bitstream 995. The partitioning constraints 1020 may include constraints that are applicable at different levels of video hierarchy (e.g., sequence, picture, slice, block) and be signaled in slice headers, picture headers, SPS, etc., by the entropy encoder 990. The partition constraints 1020 may include maximum MTT block size, minimum QT leaf size, etc. The partition engine 1010 also provide partitioning structure 1030 to the transform module 910 so the transform module may perform transform operations on a current block of pixels being coded (e.g., CTU) according to the partitioning structure 1030.

Figure 11:
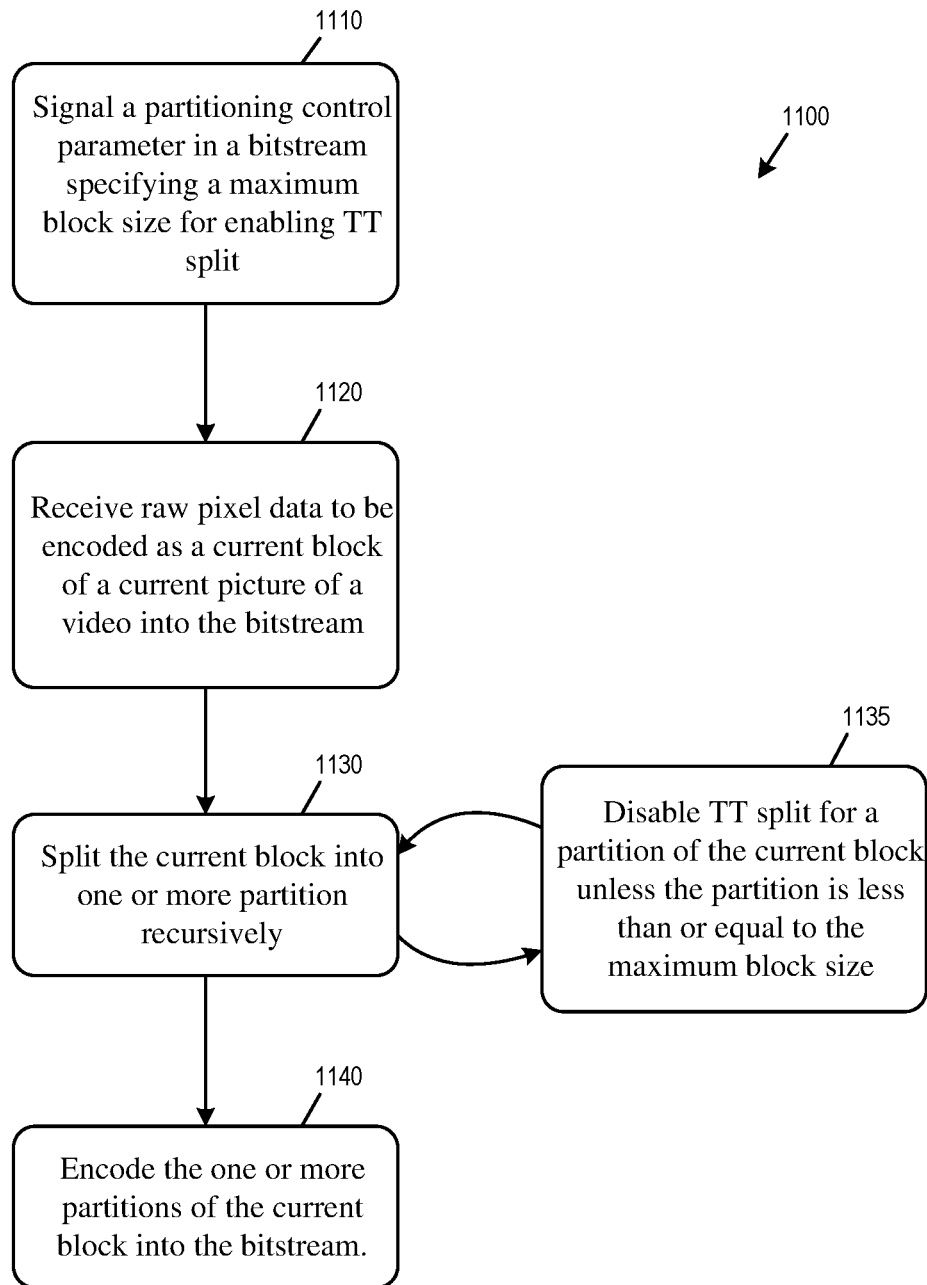
FIG. 11 conceptually illustrates a process for signaling block partitioning constraints.

FIG. 11 conceptually illustrates a process 1100 for signaling block partitioning constraints. In some embodiments, one or more processing units (e.g., a processor) of a computing device implements the encoder 900 performs the process 1100 by executing instructions stored in a computer readable medium. In some embodiments, an electronic apparatus implementing the decoder 900 performs the process 1100.

The encoder signals (at block 1110) a partitioning control parameter in a bitstream specifying a maximum block size for enabling ternary-tree split that is constrained to be 64 or smaller.

In some embodiments, the partitioning control parameter is signaled in a slice header of a slice that includes the current block. The partitioning control parameter may be signaled in a picture header of the current picture. The partitioning control parameter may be signaled in a sequence parameter set (SPS) of a sequence of video pictures that include the current picture. In some embodiments, SPS or picture header sets a default value for the partitioning control parameter that can be overridden by a slice header that includes the current block.

In some embodiments, the partitioning control parameter specifies the maximum block size by referencing a minimum size of a quadtree splitting leaf block, for example, as the difference between (i) a base 2 logarithm of the maximum block size for which a block may be further partitioned by ternary-tree split and (ii) a base 2 logarithm of the minimum size of the quad tree splitting leaf block. The minimum size of a quad tree splitting leaf block is constrained to be a smaller value between 64 and a coding tree block size. The maximum block size for enabling TT split is further constrained to be less than a coding tree block size.

The minimum size of a quad tree splitting leaf block may be specified by referencing a minimum coding block size, and the minimum size of a quad tree splitting leaf block is specified by using the difference between (i) a base 2 logarithm of the minimum size of a quad tree splitting leaf block and (ii) a base 2 logarithm of the minimum coding block size.

In some embodiments, the maximum block size is determined based on a size of a virtual pipeline data unit (VPDU), and the maximum block size is defined based on ensuring each VPDU can be entirely processed by a same pipeline stage.

The encoder receives (at block 1120) raw pixel data to be encoded as a current block of a current picture of a video into the bitstream.

The encoder splits (at block 1130) the current block into one or more partitions recursively. The encoder disallows (at block 1135) TT split for a partition of the current block unless the partition is less than or equal to the maximum block size.

The encoder encodes (at block 1140) the one or more partitions of the current block into the bitstream.

VI. Example Video Decoder

Figure 12:
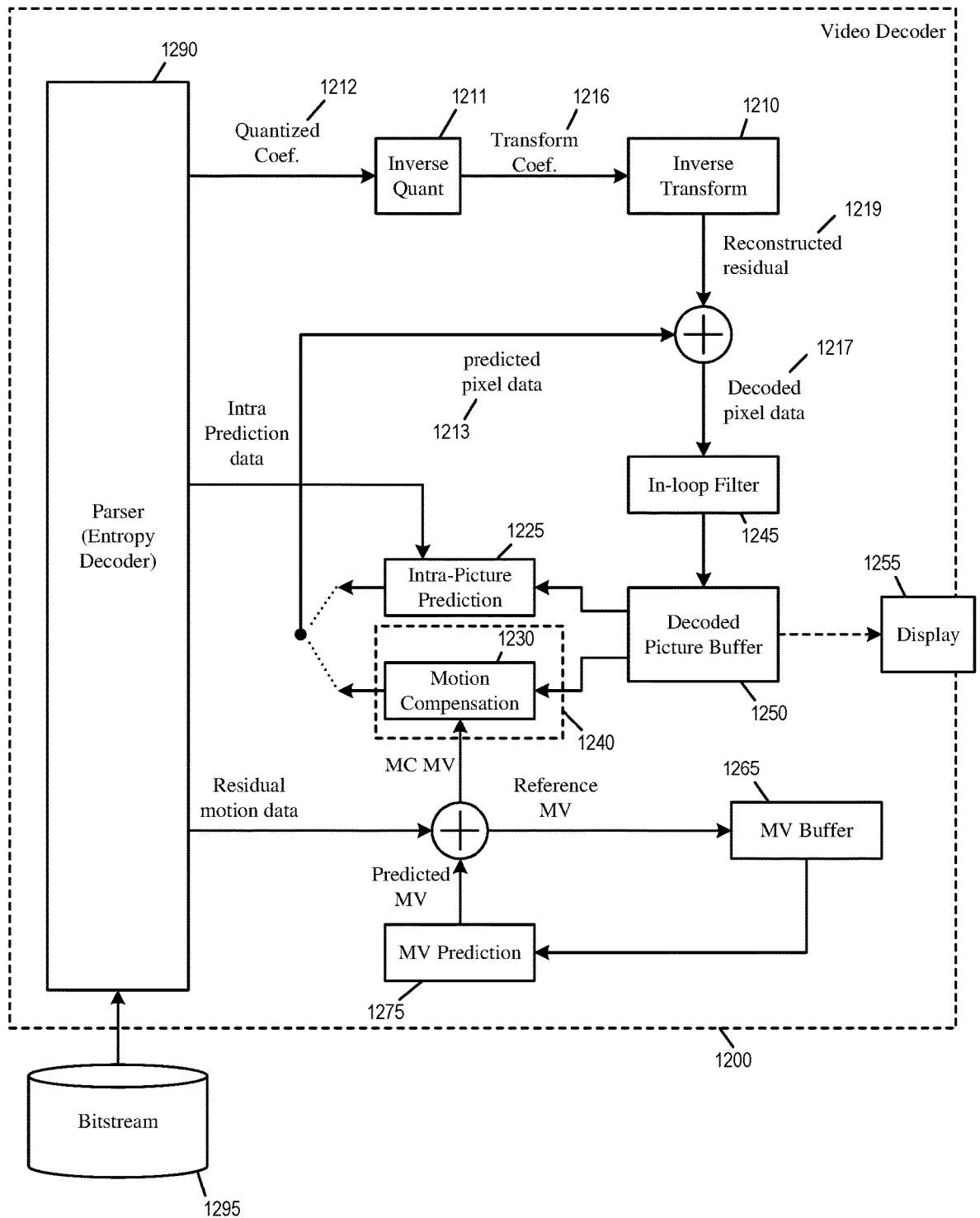
FIG. 12 illustrates an example video decoder that applies constraints on block partitioning.

FIG. 12 illustrates an example video decoder 1200 that applies constraints on block partitioning. As illustrated, the video decoder 1200 is an image-decoding or video-decoding circuit that receives a bitstream 1295 and decodes the content of the bitstream into pixel data of video frames for display. The video decoder 1200 has several components or modules for decoding the bitstream 1295, including some components selected from an inverse quantization module 1211, an inverse transform module 1210, an intra-prediction module 1225, a motion compensation module 1230, an in-loop filter 1245, a decoded picture buffer 1250, a MV buffer 1265, a MV prediction module 1275, and a parser 1290. The motion compensation module 1230 is part of an inter-prediction module 1240.

In some embodiments, the modules 1210-1290 are modules of software instructions being executed by one or more processing units (e.g., a processor) of a computing device. In some embodiments, the modules 1210-1290 are modules of hardware circuits implemented by one or more ICs of an electronic apparatus. Though the modules 1210-1290 are illustrated as being separate modules, some of the modules can be combined into a single module.

The parser 1290 (or entropy decoder) receives the bitstream 1295 and performs initial parsing according to the syntax defined by a video-coding or image-coding standard. The parsed syntax element includes various header elements, flags, as well as quantized data (or quantized coefficients) 1212. The parser 1290 parses out the various syntax elements by using entropy-coding techniques such as context-adaptive binary arithmetic coding (CABAC) or Huffman encoding.

The inverse quantization module 1211 de-quantizes the quantized data (or quantized coefficients) 1212 to obtain transform coefficients, and the inverse transform module 1210 performs inverse transform on the transform coefficients 1216 to produce reconstructed residual signal 1219.

The reconstructed residual signal 1219 is added with predicted pixel data 1213 from the intra-prediction module 1225 or the motion compensation module 1230 to produce decoded pixel data 1217. The decoded pixels data are filtered by the in-loop filter 1245 and stored in the decoded picture buffer 1250. In some embodiments, the decoded picture buffer 1250 is a storage external to the video decoder 1200. In some embodiments, the decoded picture buffer 1250 is a storage internal to the video decoder 1200.

The intra-prediction module 1225 receives intra-prediction data from bitstream 1295 and according to which, produces the predicted pixel data 1213 from the decoded pixel data 1217 stored in the decoded picture buffer 1250. In some embodiments, the decoded pixel data 1217 is also stored in a line buffer (not illustrated) for intra-picture prediction and spatial MV prediction.

In some embodiments, the content of the decoded picture buffer 1250 is used for display. A display device 1255 either retrieves the content of the decoded picture buffer 1250 for display directly, or retrieves the content of the decoded picture buffer to a display buffer. In some embodiments, the display device receives pixel values from the decoded picture buffer 1250 through a pixel transport.

The motion compensation module 1230 produces predicted pixel data 1213 from the decoded pixel data 1217 stored in the decoded picture buffer 1250 according to motion compensation MVs (MC MVs). These motion compensation MVs are decoded by adding the residual motion data received from the bitstream 1295 with predicted MVs received from the MV prediction module 1275.

The MV prediction module 1275 generates the predicted MVs based on reference MVs that were generated for decoding previous video frames, e.g., the motion compensation MVs that were used to perform motion compensation. The MV prediction module 1275 retrieves the reference MVs of previous video frames from the MV buffer 1265. The video decoder 1200 stores the motion compensation MVs generated for decoding the current video frame in the MV buffer 1265 as reference MVs for producing predicted MVs.

The in-loop filter 1245 performs filtering or smoothing operations on the decoded pixel data 1217 to reduce the artifacts of coding, particularly at boundaries of pixel blocks. In some embodiments, the filtering operation performed includes sample adaptive offset (SAO). In some embodiment, the filtering operations include adaptive loop filter (ALF).

Figure 13:
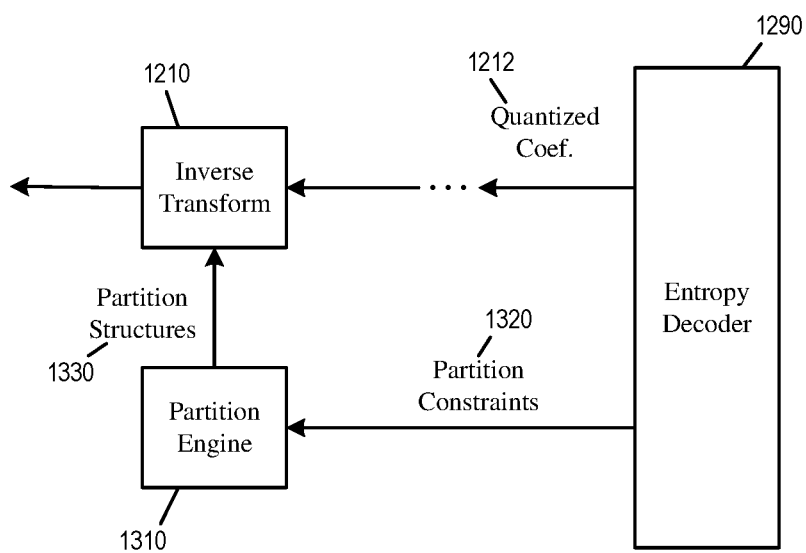
FIG. 13 illustrates portions of the video decoder that implement block partitioning constraints.

FIG. 13 illustrates portions of the video decoder 1200 that implement block partitioning constraints. Specifically, the entropy decoder 1290 parses from the bitstream 1295 syntax elements that are related to block partitioning and generates a set of partitioning constraints 1320. The partitioning constraints may include constraints that are applicable at different levels of video hierarchy (e.g., sequence, picture, slice, block) and be signaled in slice headers, picture headers, SPS, etc. The partition constraints 1320 may include maximum MTT block size, minimum QT leaf size, etc. The decoder may disallow certain split modes beyond a maximum block size in accordance with the partitioning constraints 1320.

The generated partitioning constraints 1320 are applied to a partitioning engine 1310, which generates partitioning structures 1330 for the inverse transform module 1210 so it can perform inverse transform operations on individual partitions (e.g., CUs) according to the partitioning structure.

Figure 14:
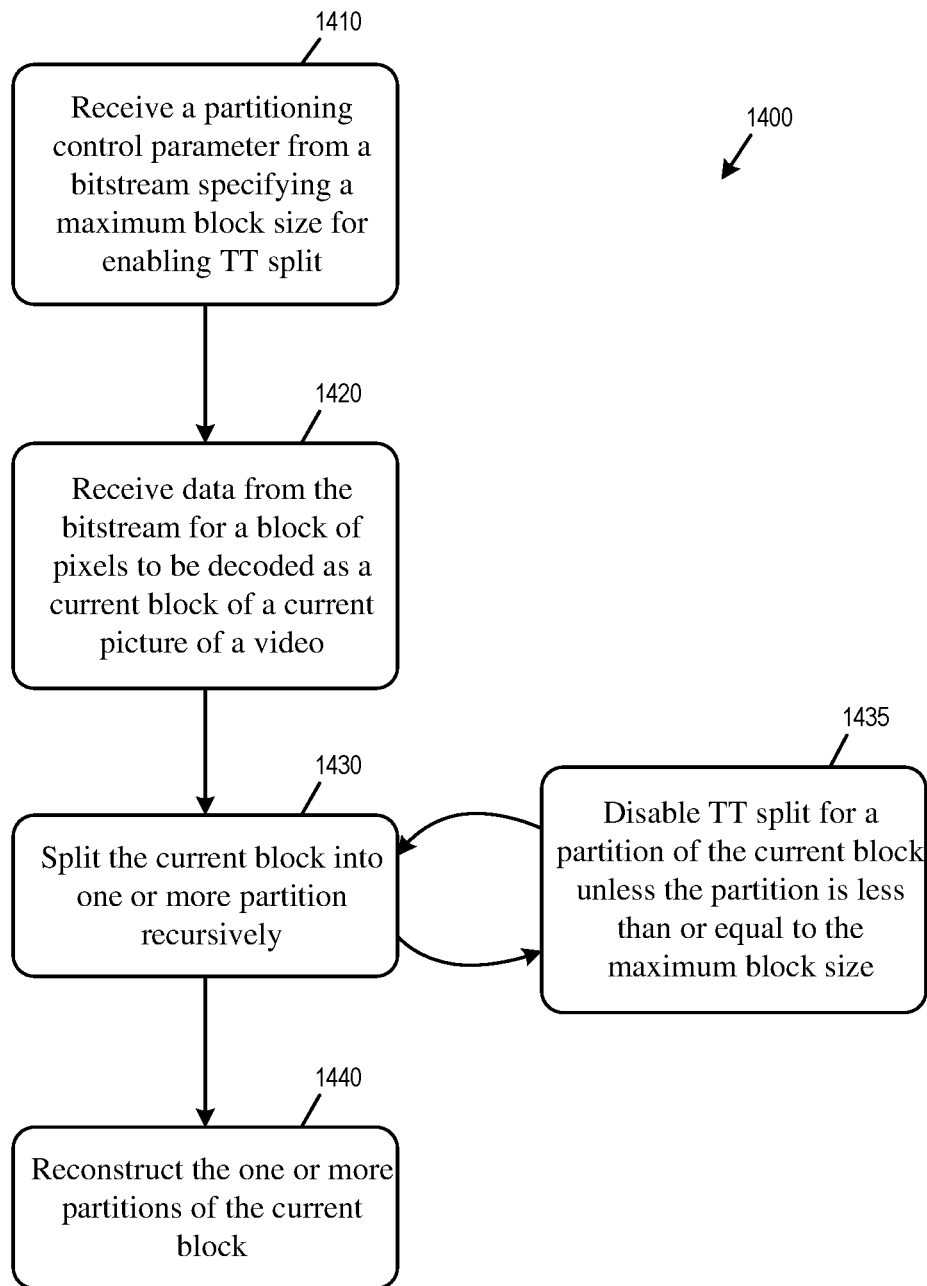
FIG. 14 conceptually illustrates a process that applies block partitioning constraints.

FIG. 14 conceptually illustrates a process 1400 that applies block partitioning constraints. In some embodiments, one or more processing units (e.g., a processor) of a computing device implements the decoder 1200 performs the process 1400 by executing instructions stored in a computer readable medium. In some embodiments, an electronic apparatus implementing the decoder 1200 performs the process 1400.

The decoder receives (at block 1410) a partitioning control parameter from a bitstream specifying a maximum block size for enabling ternary-tree (TT) split. In some embodiments, the maximum block size is constrained to be 64 or smaller.

In some embodiments, the partitioning control parameter is signaled in a slice header of a slice that includes the current block. The partitioning control parameter may be signaled in a picture header of the current picture. The partitioning control parameter may be signaled in a sequence parameter set (SPS) of a sequence of video pictures that include the current picture. In some embodiments, SPS or picture header sets a default value for the partitioning control parameter that can be overridden by a slice header that includes the current block.

In some embodiments, the partitioning control parameter specifies the maximum block size by referencing a minimum size of a quadtree splitting leaf block, for example, by using the difference between (i) a base 2 logarithm of the maximum block size for which a block may be further partitioned by ternary-tree split and (ii) a base 2 logarithm of the minimum size of the quad tree splitting leaf block. The minimum size of a quad tree splitting leaf block is constrained to be a smaller value between 64 and a coding tree block size. The maximum block size for enabling TT split may be further constrained to be less than a coding tree block size.

The minimum size of a quad tree splitting leaf block may be specified by referencing a minimum coding block size, and the minimum size of a quad tree splitting leaf block is specified by using the difference between (i) a base 2 logarithm of the minimum size of a quad tree splitting leaf block and (ii) a base 2 logarithm of the minimum coding block size.

In some embodiments, the maximum block size is determined based on a size of a virtual pipeline data unit (VPDU), and the maximum block size is defined based on ensuring each VPDU can be entirely processed by a same pipeline stage.

In some embodiments, the partitioning control parameter is signaled in a slice header of a slice that includes the current block. The partitioning control parameter may be signaled in a picture header of the current picture. The partitioning control parameter may be signaled in a sequence parameter set (SPS) of a sequence of video pictures that include the current picture. In some embodiments, SPS or picture header sets a default value for the partitioning control parameter that can be overridden by a slice header that includes the current block.

The decoder receives (at block decod20) data from a bitstream for a block of pixels to be decoded as a current block of a current picture of a video.

The decoder splits (at block 1430) the current block into one or more partitions recursively. The decoder disallows (at block 1435) TT split for a partition of the current block unless the partition is less than or equal to the maximum block size.

The decoder reconstructs (at block 1440) the one or more partitions of the current block.

In some embodiments, an encoder may signal (or generate) one or more syntax element in a bitstream, such that a decoder may parse said one or more syntax element from the bitstream.

VII. Example Electronic System

Many of the above-described features and applications are implemented as software processes that are specified as a set of instructions recorded on a computer readable storage medium (also referred to as computer readable medium). When these instructions are executed by one or more computational or processing unit(s) (e.g., one or more processors, cores of processors, or other processing units), they cause the processing unit(s) to perform the actions indicated in the instructions. Examples of computer readable media include, but are not limited to, CD-ROMs, flash drives, random-access memory (RAM) chips, hard drives, erasable programmable read only memories (EPROMs), electrically erasable programmable read-only memories (EEPROMs), etc. The computer readable media does not include carrier waves and electronic signals passing wirelessly or over wired connections.

In this specification, the term "software" is meant to include firmware residing in read-only memory or applications stored in magnetic storage which can be read into memory for processing by a processor. Also, in some embodiments, multiple software inventions can be implemented as sub-parts of a larger program while remaining distinct software inventions. In some embodiments, multiple software inventions can also be implemented as separate programs. Finally, any combination of separate programs that together implement a software invention described here is within the scope of the present disclosure. In some embodiments, the software programs, when installed to operate on one or more electronic systems, define one or more specific machine implementations that execute and perform the operations of the software programs.

Figure 15:
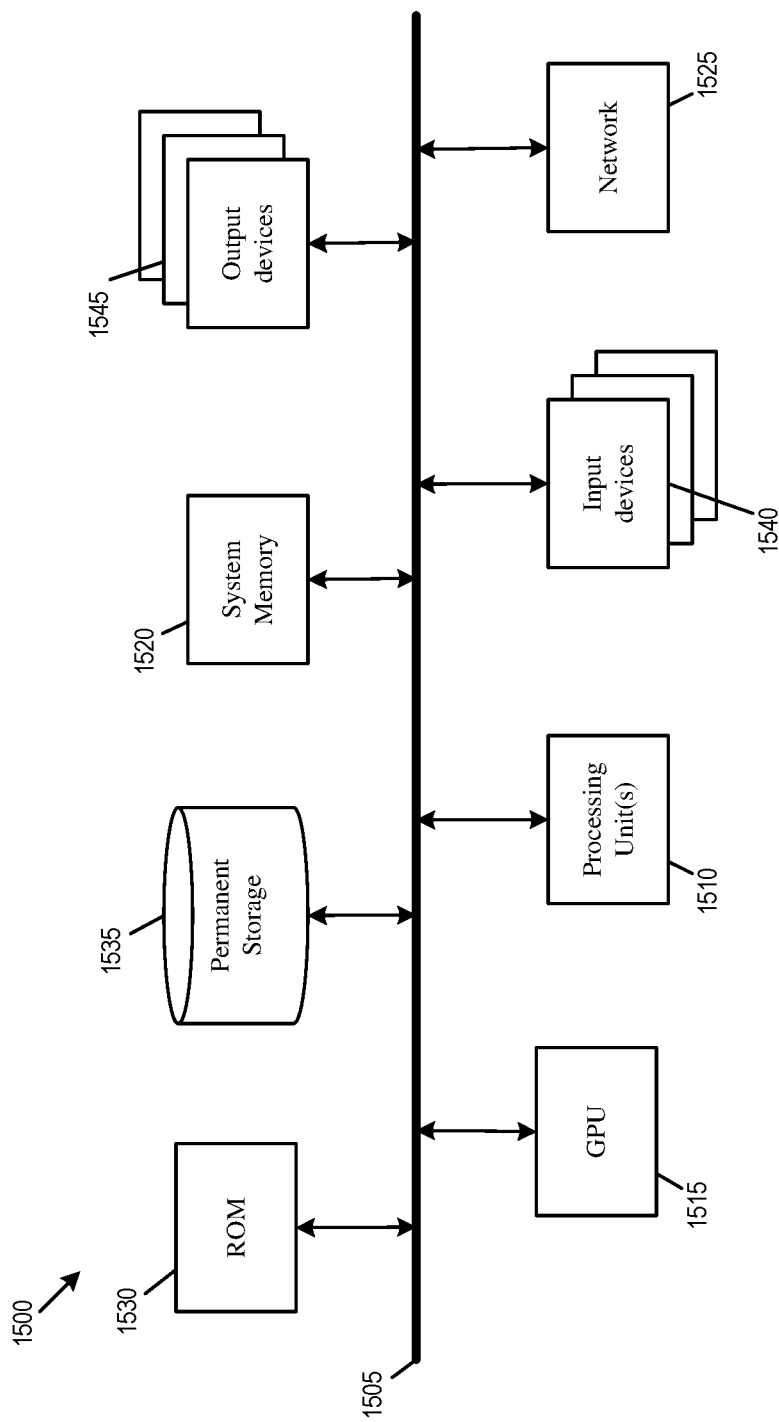
FIG. 15 conceptually illustrates an electronic system with which some embodiments of the present disclosure are implemented.

FIG. 15 conceptually illustrates an electronic system 1500 with which some embodiments of the present disclosure are implemented. The electronic system 1500 may be a computer (e.g., a desktop computer, personal computer, tablet computer, etc.), phone, PDA, or any other sort of electronic device. Such an electronic system includes various types of computer readable media and interfaces for various other types of computer readable media. Electronic system 1500 includes a bus 1505, processing unit(s) 1510, a graphics-processing unit (GPU) 1515, a system memory 1520, a network 1525, a read-only memory 1530, a permanent storage device 1535, input devices 1540, and output devices 1545.

The bus 1505 collectively represents all system, peripheral, and chipset buses that communicatively connect the numerous internal devices of the electronic system 1500. For instance, the bus 1505 communicatively connects the processing unit(s) 1510 with the GPU 1515, the read-only memory 1530, the system memory 1520, and the permanent storage device 1535.

From these various memory units, the processing unit(s) 1510 retrieves instructions to execute and data to process in order to execute the processes of the present disclosure. The processing unit(s) may be a single processor or a multi-core processor in different embodiments. Some instructions are passed to and executed by the GPU 1515. The GPU 1515 can offload various computations or complement the image processing provided by the processing unit(s) 1510.

The read-only-memory (ROM) 1530 stores static data and instructions that are used by the processing unit(s) 1510 and other modules of the electronic system. The permanent storage device 1535, on the other hand, is a read-and-write memory device. This device is a non-volatile memory unit that stores instructions and data even when the electronic system 1500 is off. Some embodiments of the present disclosure use a mass-storage device (such as a magnetic or optical disk and its corresponding disk drive) as the permanent storage device 1535.

Other embodiments use a removable storage device (such as a floppy disk, flash memory device, etc., and its corresponding disk drive) as the permanent storage device. Like the permanent storage device 1535, the system memory 1520 is a read-and-write memory device. However, unlike storage device 1535, the system memory 1520 is a volatile read-and-write memory, such a random access memory. The system memory 1520 stores some of the instructions and data that the processor uses at runtime. In some embodiments, processes in accordance with the present disclosure are stored in the system memory 1520, the permanent storage device 1535, and/or the read-only memory 1530. For example, the various memory units include instructions for processing multimedia clips in accordance with some embodiments. From these various memory units, the processing unit(s) 1510 retrieves instructions to execute and data to process in order to execute the processes of some embodiments.

The bus 1505 also connects to the input and output devices 1540 and 1545. The input devices 1540 enable the user to communicate information and select commands to the electronic system. The input devices 1540 include alphanumeric keyboards and pointing devices (also called "cursor control devices"), cameras (e.g., webcams), microphones or similar devices for receiving voice commands, etc. The output devices 1545 display images generated by the electronic system or otherwise output data. The output devices 1545 include printers and display devices, such as cathode ray tubes (CRT) or liquid crystal displays (LCD), as well as speakers or similar audio output devices. Some embodiments include devices such as a touchscreen that function as both input and output devices.

Finally, as shown in FIG. 15, bus 1505 also couples electronic system 1500 to a network 1525 through a network adapter (not shown). In this manner, the computer can be a part of a network of computers (such as a local area network ("LAN"), a wide area network ("WAN"), or an Intranet, or a network of networks, such as the Internet. Any or all components of electronic system 1500 may be used in conjunction with the present disclosure.

Some embodiments include electronic components, such as microprocessors, storage and memory that store computer program instructions in a machine-readable or computer-readable medium (alternatively referred to as computer-readable storage media, machine-readable media, or machine-readable storage media). Some examples of such computer-readable media include RAM, ROM, read-only compact discs (CD-ROM), recordable compact discs (CD-R), rewritable compact discs (CD-RW), read-only digital versatile discs (e.g., DVD-ROM, dual-layer DVD-ROM), a variety of recordable/rewritable DVDs (e.g., DVD-RAM, DVD-RW, DVD+RW, etc.), flash memory (e.g., SD cards, mini-SD cards, micro-SD cards, etc.), magnetic and/or solid state hard drives, read-only and recordable Blu-Ray® discs, ultra-density optical discs, any other optical or magnetic media, and floppy disks. The computer-readable media may store a computer program that is executable by at least one processing unit and includes sets of instructions for performing various operations. Examples of computer programs or computer code include machine code, such as is produced by a compiler, and files including higher-level code that are executed by a computer, an electronic component, or a microprocessor using an interpreter.

While the above discussion primarily refers to microprocessor or multi-core processors that execute software, many of the above-described features and applications are performed by one or more integrated circuits, such as application specific integrated circuits (ASICs) or field programmable gate arrays (FPGAs). In some embodiments, such integrated circuits execute instructions that are stored on the circuit itself. In addition, some embodiments execute software stored in programmable logic devices (PLDs), ROM, or RAM devices.

As used in this specification and any claims of this application, the terms "computer", "server", "processor", and "memory" all refer to electronic or other technological devices. These terms exclude people or groups of people. For the purposes of the specification, the terms display or displaying means displaying on an electronic device. As used in this specification and any claims of this application, the terms "computer readable medium," "computer readable media," and "machine readable medium" are entirely restricted to tangible, physical objects that store information in a form that is readable by a computer. These terms exclude any wireless signals, wired download signals, and any other ephemeral signals.

While the present disclosure has been described with reference to numerous specific details, one of ordinary skill in the art will recognize that the present disclosure can be embodied in other specific forms without departing from the spirit of the present disclosure. In addition, a number of the figures (including FIG. 11 and FIG. 14) conceptually illustrate processes. The specific operations of these processes may not be performed in the exact order shown and described. The specific operations may not be performed in one continuous series of operations, and different specific operations may be performed in different embodiments. Furthermore, the process could be implemented using several sub-processes, or as part of a larger macro process. Thus, one of ordinary skill in the art would understand that the present disclosure is not to be limited by the foregoing illustrative details, but rather is to be defined by the appended claims.

Additional Notes

The herein-described subject matter sometimes illustrates different components contained within, or connected with, different other components. It is to be understood that such depicted architectures are merely examples, and that in fact many other architectures can be implemented which achieve the same functionality. In a conceptual sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermediate components. Likewise, any two components so associated can also be viewed as being "operably connected", or "operably coupled", to each other to achieve the desired functionality, and any two components capable of being so associated can also be viewed as being "operably couplable", to each other to achieve the desired functionality. Specific examples of operably couplable include but are not limited to physically mateable and/or physically interacting components and/or wirelessly interactable and/or wirelessly interacting components and/or logically interacting and/or logically interactable components.

Further, with respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

Moreover, it will be understood by those skilled in the art that, in general, terms used herein, and especially in the appended claims, e.g., bodies of the appended claims, are generally intended as "open" terms, e.g., the term "including" should be interpreted as "including but not limited to," the term "having" should be interpreted as "having at least," the term "includes" should be interpreted as "includes but is not limited to," etc. It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to implementations containing only one such recitation, even when the same claim includes the introductory phrases "one or more" or "at least one" and indefinite articles such as "a" or "an," e.g., "a" and/or "an" should be interpreted to mean "at least one" or "one or more;" the same holds true for the use of definite articles used to introduce claim recitations. In addition, even if a specific number of an introduced claim recitation is explicitly recited, those skilled in the art will recognize that such recitation should be interpreted to mean at least the recited number, e.g., the bare recitation of "two recitations," without other modifiers, means at least two recitations, or two or more recitations. Furthermore, in those instances where a convention analogous to "at least one of A, B, and C, etc." is used, in general such a construction is intended in the sense one having skill in the art would understand the convention, e.g., "a system having at least one of A, B, and C" would include but not be limited to systems that have A alone, B alone, C alone, A and B together, A and C together, B and C together, and/or A, B, and C together, etc. In those instances where a convention analogous to "at least one of A, B, or C, etc." is used, in general such a construction is intended in the sense one having skill in the art would understand the convention, e.g., "a system having at least one of A, B, or C" would include but not be limited to systems that have A alone, B alone, C alone, A and B together, A and C together, B and C together, and/or A, B, and C together, etc. It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

From the foregoing, it will be appreciated that various implementations of the present disclosure have been described herein for purposes of illustration, and that various modifications may be made without departing from the scope and spirit of the present disclosure. Accordingly, the various implementations disclosed herein are not intended to be limiting, with the true scope and spirit being indicated by the following claims.

What is claimed is:

1. A video decoding method, comprising:
receiving a partitioning control parameter from a bitstream, the partitioning control parameter specifying a maximum size of a ternary tree (TT) splitting leaf block;
receiving data from the bitstream for a block of pixels to be decoded as a current block of a current picture of a video;
splitting the current block into one or more partitions recursively, wherein TT split is disallowed for a partition of the current block unless the partition is less than or equal to the maximum size of a TT splitting leaf block; and
reconstructing the one or more partitions of the current block,
wherein a specific value is derived using a smaller one between 64 and a coding tree block size, the specific value is taken as a maximum specified value of the maximum size of a ternary tree (TT) splitting leaf block.

2. The video decoding method of claim 1, wherein the partitioning control parameter is specified by using a difference between (i) a base 2 logarithm of the maximum size of a TT splitting leaf block and (ii) a base 2 logarithm of a minimum size of a QT splitting leaf block.

3. The video decoding method of claim 2, wherein the maximum size of a TT splitting leaf block is determined based on a size of a virtual pipeline data unit (VPDU).

4. The video decoding method of claim 3, wherein the maximum size of a TT splitting leaf block is defined based on ensuring each VPDU can be entirely processed by a same pipeline stage.

5. A video encoding method, comprising:
signaling a partitioning control parameter in a bitstream, the partitioning control parameter specifying a maximum size of a ternary tree (TT) splitting leaf block;
receiving raw pixel data to be encoded as a current block of a current picture of a video into the bitstream;
splitting the current block into one or more partitions recursively, wherein TT split is disallowed for a partition of the current block unless the partition is less than or equal to the maximum size of a TT splitting leaf block; and
encoding the one or more partitions of the current block into the bitstream,
wherein a specific value is derived using a smaller one between 64 and a coding tree block size, the specific value is taken as a maximum specified value of the maximum size of a ternary tree (TT) splitting leaf block.

6. An electronic apparatus, comprising:
a video decoder circuit configured to perform operations comprising:
receiving a partitioning control parameter from a bitstream, the partitioning control parameter specifying a maximum size of a ternary tree (TT) splitting leaf block;
receiving data from the bitstream for a block of pixels to be decoded as a current block of a current picture of a video;
splitting the current block into one or more partitions recursively, wherein TT split is disallowed for a partition of the current block unless the partition is less than or equal to the maximum size of a TT splitting leaf block; and reconstructing the one or more partitions of the current block, wherein a specific value is derived using a smaller one between 64 and a coding tree block size, the specific value is taken as a maximum specified value of the maximum size of a ternary tree (TT) splitting leaf block.

* * * * *